United States Patent [19]

Eastman

[11] 4,048,128
[45] Sept. 13, 1977

[54] THERMALLY STABILIZED SEGMENTED COPOLYESTER ADHESIVE

[75] Inventor: Ernest Francis Eastman, Wilmington, Del.

[73] Assignee: E. I. Du Pont de Nemours and Company, Wilmington, Del.

[21] Appl. No.: 634,064

[22] Filed: Nov. 21, 1975

Related U.S. Application Data

[63] Continuation-in-part of Ser. No. 443,984, Feb. 20, 1974, abandoned.

[51] Int. Cl.$^2$ .................. C08K 3/22; C08L 67/00; C08L 91/00
[52] U.S. Cl. .................. 260/22 R; 156/332; 260/26; 260/28 R; 260/28.5 AS; 260/45.7 R; 260/45.7 P; 260/45.85; 260/45.9 R; 260/45.9 P; 260/45.95 R; 260/75 T; 260/829; 260/843; 260/860; 260/873
[58] Field of Search ............... 260/860, 75 T, 40 R, 260/45.7 R, 23, 26, 28, 22 R, 843, 873, 28.5 AS, 829; 156/332

[56] References Cited

U.S. PATENT DOCUMENTS

| | | | |
|---|---|---|---|
| 3,193,522 | 7/1965 | Neumann et al. | 260/860 X |
| 3,219,604 | 11/1965 | Fischer | 260/22 T |
| 3,431,320 | 3/1969 | Baum et al. | 260/865 |
| 3,465,061 | 9/1969 | Fekete et al. | 260/865 |
| 3,663,653 | 5/1972 | Frohlich et al. | 260/860 |
| 3,740,372 | 6/1973 | Baum et al. | 260/40 R |
| 3,832,314 | 8/1974 | Hoh et al. | 260/75 T |
| 3,844,995 | 10/1974 | Kloker et al. | 260/40 R |
| 3,909,333 | 9/1975 | Eastman | 156/332 X |
| 3,969,294 | 7/1976 | Papouchado | 260/26 |

OTHER PUBLICATIONS

Warner, 28th Annual Technical Conference, 1973 Reinforced Plastics/Composites Institute The Society of the Plastics Industry, Inc., Sec. 19-E, pp. 1–12.

Primary Examiner—Howard E. Schain
Assistant Examiner—W. C. Danison, Jr.

[57] ABSTRACT

Thermally stabilized thermoplastic segmented copolyester of recurring short chain ester units and long chain ester units joined through ester linkages, having a melt index of less than 150 and a melting point of at least 90° C., an inherent viscosity in the range of 1.0 to 1.7 and an acid number not greater than 3, stabilized with 0.05 to 3.0 percent by weight, based on the weight of copolyester, of an alkaline earth oxide. Improved stabilizing effect can be achieved when 0.25 to 2.5 percent by weight, based on the weight of copolyester, of the alkaline earth oxide is used in conjunction with 0.25 to 2.5 percent by weight, based on the weight of copolyester, of a substantially linear polycarbodiimide. Additional optional materials that can be added with the stabilizer, based on the weight of copolyester, include: 0.25 to 5.0 percent by weight of a compound taken from the group consisting of hindered phenols, nitrogen-containing hindered phenols and hindered secondary amines; 0.25 to 5.0 percent by weight of a thioalkylpropionate ester of 12 to 18 carbon atoms; 0.25 to 5.0 percent by weight of a phosphorous acid ester; or mixtures thereof. A useful stabilized adhesive composition comprises (A) 1 to 99 percent by weight of segmented copolyester, (B) 1 to 99 percent by weight of a compatible low molecular weight thermoplastic resin, and (C) 0.1 to 4.0 percent by weight, based on the weight of copolyester and resin of the alkaline earth oxide, preferably calcium oxide, stabilizer.

66 Claims, No Drawings

THERMALLY STABILIZED SEGMENTED COPOLYESTER ADHESIVE

CROSS-REFERENCE TO RELATED APPLICATION

This application is a continuation-in-part of application Ser. No. 443,984, filed Feb. 20, 1974, now abandoned.

BACKGROUND OF THE INVENTION

1. Field of the Invention

This invention relates to stabilized thermoplastic, segmented copolyesters, to blends of such stabilized copolyesters with one or more compatible low molecular weight thermoplastic resins and to a method for preparing such blends.

2. Description of the Prior Art

Copolyesters, and particularly segmented copolyesters, are used in the formulation of adhesives such as those useful as hot melt adhesives. Such adhesive compositions are described in U.S. Pat. No. 3,832,314 and Hoh and Reardon Ser. No. 439,848, filed Feb. 6, 1974. The compositions of U.S. Pat. No. 3,832,314 have good bond strength as hot melt adhesives and the compositions of the Hoh and Reardon application are particularly useful as pressure sensitive adhesives. In order to provide good adhesive properties the viscosity of the adhesive compositions must be maintained at a relatively constant level. It has been found that at elevated temperatures, particularly in the range of 170° to 200° C., over a period of several hours the aforementioned adhesive compositions lose viscosity and hence their bonding properties are reduced. Known stabilizers or antioxidants such as tetrakis[methylene-3-(3′,5′-ditertiary-butyl-4′-hydroxyphenyl) propionate] methane, and phosphite ester compounds, have been incorporated in hot melt adhesive compositions containing segmented copolyesters, but these stabilizers have not proved to be very effective over extended periods of time, e.g., two hours and more.

Materially improved stabilization of adhesive compositions containing segmented copolyesters has been achieved as described in U.S. Pat. No. 3,909,333 utilizing a stabilizer mixture comprising (a) a substantially linear polycarbodiimide having an average of at least two carbodiimide groups per molecule, and at least one compound taken from the group consisting of (b) a hindered phenol, nitrogen-containing hindered phenol, or secondary aromatic amine; (c) phosphorous acid esters of the formula

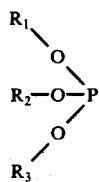

where $R_1$, $R_2$ and $R_3$ are $C_1$ to $C_{18}$ aliphatic, $C_6$ to $C_{15}$ aromatic, and combinations thereof; and (d) a homopolymer of an amino acrylate compound of the formula

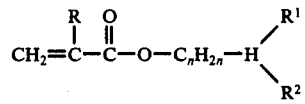

where R is hydrogen or methyl, $R^1$ is hydrogen or alkyl of 1 to 4 carbon atoms, $R^2$ is alkyl of 1 to 4 carbon atoms, and n is an integer of 1 to 4 inclusive; and a random copolymer of ethylene and 20 to 40 percent by weight of the amino acrylate, each of the compounds (b), (c) and (d) being compatible with each other and with (a). While providing good stabilization of segmented copolyester compositions, the stabilizer mixture of U.S. Pat. No. 3,909,333 is relatively expensive and may create compatibility problems in some adhesive formulations. It was therefore desirable to discover a single stabilizer compound which is compatible in conjunction with other components and not only provide excellent stabilization but is inexpensive and is also compatible with known segmented copolyester adhesive compositions.

SUMMARY OF THE INVENTION

In accordance with this invention superior stabilized thermoplastic segmented copolyesters are provided which consist essentially of a multiplicity of recurring short chain ester units and long chain ester units joined through ester linkages, said short chain ester units amounting to 15 to 75 percent by weight of said copolyester and being of the formula

and said long chain ester units amounting to 25 to 85 percent by weight of said copolyester and being of the formula

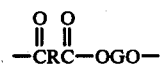

wherein R is the divalent radical remaining after removal of the carboxyl groups from a dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000, said copolyester having a melt index of less than 150, a melting point of at least 90° C., an inherent viscosity in the range of 1.0 to 1.7 and an acid number not greater than 3 stabilized with 0.05 to 3.0 percent by weight, based on the weight of copolyester, of an alkaline earth oxide.

Improved stability, in many instances, is achieved by having present with the alkaline earth oxide 0.25 to 2.5 percent by weight, based on the weight of copolyester, of a substantially linear polycarbodiimide having an average of at least two carbodiimide groups per molecule. Optionally materials that can be added, singly or in combination, with the alkaline earth oxide stabilizer, optionally containing the polycarbodiimide compound, based on the weight of copolyester, include: 0.25 to 5.0 percent by weight of a compound taken from the group consisting of hindered phenols, nitrogen-containing hindered phenols, and hindered secondary amines; 0.25 to 5.0 percent by weight of a thioalkylpropionate ester of 12 to 18 carbon atoms; 0.25 to 5.0 percent by weight of a phosphorous acid ester of the formula

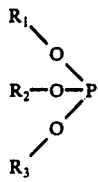

where $R_1$, $R_2$ and $R_3$ are $C_1$ to $C_{18}$ aliphatic, $C_6$ to $C_{15}$ aromatic, and combinations thereof.

The components that make up the stabilizer are compatible with one another.

Improved stabilized thermoplastic compositions are provided which comprise, based on the total thermoplastic components, (A) 1 to 99 percent by weight of thermoplastic segmented copolyester described above; (B) 1 to 99 percent by weight of low molecular weight thermoplastic resin which forms compatible mixtures with the segmented copolyester, is thermally stable at 150° C., and has a melt viscosity of less than 10,000 centipoises at 200° C. stabilized with 0.1 to 4.0 percent by weight, based on the weight of copolyester and resin, of an alkaline earth oxide. To provide improved thermoplastic compositions there can be present with the alkaline earth oxide 0.1 to 1.0 percent by weight, based on the weight of copolyester and resin, of a substantially linear polycarbodiimide having an average of at least two carbodiimide groups per molecule.

Optionally, singly or in combination, the following materials can be present with the aforementioned stabilizer or stabilizer mixture, based on the weight of copolyester and resin: 0.1 to 2.0 parts by weight of a compound taken from the group consisting of hindered phenols, nitrogen-containing hindered phenols and hindered secondary amines; 0.1 to 2.0 percent by weight of a dialkylthiodipropionate ester of 12 to 18 carbon atoms; 0.1 to 2.0 percent by weight of a phosphorous acid ester as described above. The components that make up the stabilizer are compatible with one another.

DETAILED DESCRIPTION OF THE INVENTION

The stabilized thermoplastic segmented copolyesters used in the compositions of this invention consist essentially of 15 to 75 percent recurring short chain ester units and 25 to 85 percent long chain ester units joined through ester linkages.

The term "short chain ester units", as applied to units in a polymer chain, refers to the reaction products of low molecular weight diols with dicarboxylic acids to form repeat units having molecular weights of less than about 550. These units are also referred to herein as "hard segments".

The term "long chain ester units", as applied to units in a polymer chain, refers to the reaction products of long chain glycols with dicarboxylic acids. These units are also referred to herein as "soft segments". Preferably the copolyester consists essentially of 15 to 65 percent hard segments and 35 to 85 percent soft segments.

The soft thermoplastic segmented copolyesters consist essentially of about 15 to 50 percent recurring short chain ester units and about 50 to 85 percent long chain ester units joined through ester linkages. In these copolyesters the term short chain ester units, as applied to units in a polymer chain, refers to the reaction of butanediol (BDO) with aromatic dicarboxylic acids. In these copolyesters the term long chain ester units, as applied to units in a polymer chain, refers to the reaction products of polytetramethylene ether glycol (PTMEG) with dicarboxylic acids. Preferably, the copolyester consists essentially of about 15 to less than 30 percent hard segments and more than 70 to 85 percent soft segments.

The weight percent of long chain ester (LCE) units specified herein are calculated in accordance with the following equation in which both the numerator and denominator are expressed in grams.

$$\text{Wt. \% LCE} = \frac{A + B - C}{\text{Theoretical Polymer Yield}}$$

A = (Moles of PTMEG)×(Mole Wt. of PTMEG)
B = (Total Moles of phthalate as Acid)×(Mole Wt. of phthalic Acid Mixture)
C = (Moles $H_2O$)×(Mole Wt. of $H_2O$)

In this equation the moles of phthalate will be the same as the moles of PTMEG and the moles of water will be twice that of PTMEG. The mole weight of the phthalic acid mixture should be a weighted average reflecting the composition of the mixture. The theoretical polymer yield will be the grams of ingredients put into the reaction minus the grams of by-product and excess ingredients distilled off.

The weight percent of short chain ester (SCE) units is defined in an analogous manner:

$$\text{Wt. \% SCE} = \frac{D + E - F}{\text{Theoretical Polymer Yield}}$$

D = (Moles of BDO)×(Mole Wt. of BDO)
E = (Total Moles of phthalate as Acid)×(Mole Wt. of phthalic Acid Mixture)
F = (Moles $H_2O$)×(Mole Wt. of $H_2O$)

Here the moles of butanediol do not include any stoichiometric excess.

The copolyesters used in accordance with this invention are prepared by polymerizing with each other (a) one or more dicarboxylic acids such as saturated cyclic, aromatic and saturated aliphatic dicarboxlic acids, preferably aromatic dicarboxylic acids, and (b) one or more low molecular weight diols. The term "dicarboxylic acid", as used herein, is intended to include the equivalents of dicarboxylic acids, that is, their esters or ester-forming derivatives such as acid chlorides and anhydrides, or other derivatives which behave substantially like dicarboxylic acids in a polymerization reaction with glycol. By the term "aromatic dicarboxylic acid" is meant a dicarboxylic acid in which each carboxyl group is attached to a carbon atom in an isolated or fused benzene ring, e.g., naphthalene, or a ring which is itself fused to a benzene ring. Specifically, in preparing the soft thermoplastic segmented copolyesters a mixture of aromatic dicarboxylic acids containing about 55 to 95 percent by weight of terephthalic acid, polytetramethylene ether glycol, and butanediol are polymerized with each other.

The dicarboxylic acid monomers useful herein have a molecular weight of less than about 350. This molecular weight requirement pertains to the acid itself and not to its ester or ester-forming derivative. Thus, the ester of a dicarboxylic acid having a molecular weight greater than 350 is included in this invention provided the acid itself has a molecular weight below about 350.

The dicarboxylic acids used in the preparation of the segmented copolyester are aromatic, saturated cycloaliphatic, saturated aliphatic dicarboxylic acids of low molecular weight, or mixtures of said acids and can contain any substituent groups or combination thereof which do not interfere with the polymerization reaction. Representative aromatic dicarboxylic acids include terephthalic acid, isophthalic acid, phthalic acid, bibenzoic acid, substituted dicarboxy compounds with benzene nuclei such as bis(p-carboxyphenyl) methane, p-oxy(p-carboxyphenyl) benzoic acid, ethylene-bis(p-oxybenzoic acid), ethylene-bis-(p-benzoic acid), tetramethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, indene dicarboxylic acid, and the like, as well as ring substituted derivatives thereof such as $C_1$-$C_{10}$ alkyl, halo, alkoxy or aryl derivatives. Hydroxy acids such as p($\beta$-hydroxyethoxy) benzoic acid can also be used providing an aromatic dicarboxylic acid is also present.

Representative saturated cycloaliphatic and aliphatic acids include sebacic acid, 1,3-cyclohexane dicarboxylic acid, 1,4-cycohexane dicarboxylic acid, adipic acid, glutaric acid, succinic acid, oxalic acid, azelaic acid, diethyl-malonic acid, 2-ethylsuberic acid, 2,2,3,3-tetramethylsuccinic acid, cyclopentanedicarboxylic acid, decahydro-1,5-naphthylene dicarboxylic acid, 4,4'-bicyclohexyl dicarboxylic acid, decahydro-2,6-naphthylene dicarboxylic acid, 4,4'-methylenebis-(cyclohexyl) carboxylic acid, 3,4-furan dicarboxylic acid, and 1,1-cyclobutane dicarboxylic acid. Preferred saturated cycloaliphatic and aliphatic acids, respectively, are cyclohexane-dicarboxylic acids and adipic acid.

The preferred dicarboxylic acids for preparation of the segmented copolyester are the aromatic acids of 8 to 16 carbon atoms, particularly phenylene dicarboxylic acids such as phthalic, terephthalic and isophthalic acids. The most preferred acids are terephthalic acid and mixtures of terephthalic and isophthalic acids. In the soft copolyester, preferably, the mixture of aromatic dicarboxylic acids contains about 60 to 95 percent terephthalic acid, the remainder being isophthalic acid.

The low molecular weight diols used in the preparation of the hard segments of the copolyesters have molecular weights of less than about 250. The term "low molecular weight diol", as used herein, should be construed to include equivalent ester-forming derivatives. In this case, however, the molecular weight requirement pertains to the diol only and not to its derivatives.

Suitable low molecular weight diols which react to form the short chain ester units of the copolyesters include acyclic, alicyclic and aromatic dihydroxy compounds. The preferred diols are those with 2 to 15 carbon atoms such as ethylene, propylene, tetramethylene, isobutylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, and the like. Especially preferred are the aliphatic diols of 2 to 8 carbon atoms. Suitable bis-phenols include bis(p-hydroxy) diphenyl, bis(p-hydroxyphenyl) methane, bis(p-hydroxyphenyl) ethane, bis(p-hydroxyphenyl) propane and 2,2-bis(p-hydroxyphenyl) propane. Equivalent ester-forming derivatives of diols are also useful. For example, ethylene oxide or ethylene carbonate can be used in place of ethylene glycol.

The long chain glycols used to prepare the soft segments of these copolyesters have molecular weights of about 350 to 6000, and preferably about 600 to 3000. Preferably the long chain glycols have melting points of less than about 75° C.

The chemical structure of the long chain polymeric part of the long chain glycol is not critical. Any substituent groups which do not interfere with the polymerization reaction to form the copolyester can be present. Thus, the chain can be a single divalent acyclic, alicyclic, or aromatic hydrocarbon group, poly(alkylene oxide) group, polyester group, a combination thereof, or the like. Any of these groups can contain substituents which do not interfere to any substantial extent with the polymerization to form the copolyester used in accordance with this invention. The hydroxy functional groups of the long chain glycols ued to prepare the copolyesters should be terminal groups to the extent possible.

Suitable long chain glycols which can be used in preparing the soft segments of the copolymers include poly(alkylene ether) glycols in which the alkylene groups are of 2 to 9 carbon atoms such as poly(ethylene ether) glycols, poly(1,2- and 1,3-propylene ether) glycol, poly(1,2-butylene ether) glycol, poly(tetramethylene ether) glycol, poly(pentamethylene ether) glycol, poly(hexamethylene ether) glycol, poly(heptamethylene ether) glycol, poly(octamethylene ether) glycol, poly(nonamethylene ether) glycol, and random or block copolymers thereof, for example, glycols derived from ethylene oxide and 1,2-propylene oxide.

Glycol esters of poly(alkylene oxide) dicarboxylic acids can also be used as the long chain glycol. These glycol esters can be added to the polymerization reaction or can be form in situ by the reaction of a dicarboxymethyl acid of poly(alkylene oxide) such as $HOOCCH_2(OCH_2CH_2CH_2CH_2)_xOCH_2COOH$ (x is 2 to 90) with the low molecular weight diol, which is always present in a stoichiometric excess. The resulting poly(alkylene oxide) ester glycol then polymerizes to form G units having the structure $-DOOCCH_2(OCH_2CH_2CH_2CH_2)_xOCH_2COOD-$ (x is 2 to 90) in which each diol cap (D) may be the same or different depending on whether more than one diol is used. These dicarboxylic acids may also react in situ with the long chain glycol, in which case a material is obtained having a formula the same as above except that the D's are replaced by G's, the polymeric residue of the long chain glycol. The extent to which this reaction occurs is quite small, however, since the low molecular weight diol is present in considerable excess.

Polyester glycols can also be used as the long chain glycol. In using polyester glycols, care must generally be exercised to control the tendency to interchange during melt polymerization. Certain sterically hindered polyesters, e.g., poly(2,2-dimethyl-1,3-propylene adipate), poly(2,2-dimethyl-1,3-propylene/2-methyl-2-ethyl-1,3-propylene 2,5-dimethylterephthalate), poly(2,2-dimethyl-1,3-propylene/2,2-diethyl-1,3-propylene, 1,4-cyclohexanedicarboxylate) and poly(1,2-cyclohexylenedimethylene/2,2-dimethyl-1,3-propylene, 1,4-cyclohexanedicarboxylate) can be utilized under normal reaction conditions, and other more reactive polyester glycols can be used if proper reaction conditions, including a short residence time, are employed.

Suitable long chain glycols also include polyformals prepared by reacting formaldehyde with glycols such as pentamethylene glycol or mixtures of glycols such as a mixture of tetramethylene and pentamethylene glycols. Polythioether glycols also provide useful products. Polybutadiene and polyisoprene glycols, copolymers of these, and saturated hydrogenation products of these materials are also satisfactory long chain polymeric glycols. In addition, the glycol esters of dicarboxylic acids formed by oxidation of polyisobutylene-diene copolymers are useful raw materials. The preferred long chain glycols are poly(alkylene ether) glycols and glycol esters of poly(alkylene oxide) dicarboxylic acids.

Butanediol is used in the preparation of the hard segments of preferred copolyesters. The term "butanediol", as used herein, should be construed to include equivalent ester-forming derivatives such as tetrahydrofuran or butanediacetate.

The polytetramethylene ether glycols used to prepare the soft segments of these copolyesters have molecular weights of about 600 to 3500, and preferably about 600 to 2100.

The relative molecular weight of the segmented copolyester is expressed herein in terms of melt index, which is an empirical measurement of inverse melt viscosity. The segmented copolyesters should have a melt index of less than about 150, less than about 30 for the soft copolyesters, in order to provide useful compositions. The lower melt indices provide compositions having superior pressure sensitive properties. The melt indices specified herein are determined by the American Society for Testing and Materials (herein abbreviated "ASTM") test method D 1238-65T using Condition E at 190° C. with a 2160 gram load.

The segmented copolyester, which is a substantially carboxyl free copolymer, in one embodiment, has a melting point of at least about 125° C. and preferably a melting point of at least about 140° C. The soft copolyesters have a melting point of about 90° to 130° C. The high melting segmented copolyesters used herein maintain their high melting characteristics when blended with low molecular weight thermoplastic resins in accordance with this invention.

The high melting point of the segmented copolyester is obtained by providing the polyester with crystallizable short chain ester segments. Crystallinity in the short chain ester segments is increased by the use of more linear and symmetrical diacid illustrated with aromatic diacids. By "linear" aromatic diacid is meant a diacid in which each of the bonds between the carboxyl carbons and their adjacent carbons fall on a straight line drawn from one carboxyl carbon to the other. By "symmetrical" aromatic diacid is meant a diacid which is symmetrical with respect to a center line drawn from one carboxyl carbon to the other. For example, repeating ester units such as tetramethylene terephthalate give an especially high melting short chain ester segment. On the other hand, when a non-linear and unsymmetrical aromatic diacid, such as isophthalic acid, is added to crystallizable short chain ester segments, their melting point is depressed. Small amounts of isophthalic acid are, however, very useful for controlling the melting point and improving the compatibility of segmented copolyesters with low molecular weight thermoplastic resins. In preparing the harder copolyesters aliphatic dibasic acids should be avoided since they give low melting or non-crystalline short chain ester segments.

The melting points specified herein are determined by differential thermal or thermomechanical analysis. In thermal analysis the melting point is read from the position of the endotherm peak in a thermogram when the sample is heated from room temperature at the range of 10° C./min. The details of this method are described in many publications, for example, by C. B. Murphy in *Differential Thermal Analysis*, R. C. Mackenzie, Editor, Volume I, Pages 643 to 671, Academic Press, New York, 1970. In thermomechanical analysis the melting point is determined by measuring penetration of a penetrometer type probe into a polymer sample at 10 grams load with the temperature programmed at 5° C./min. The details of this method are described in many publications, for example, in *Du Pont Technical Literature for Model* 941 *Thermomechanical Analyzer*, Du Pont Co., Wilmington, Delaware, Oct. 1, 1968.

Inherent viscosity of the segmented copolyester is determined by standard techniques, 0.1 g./100 ml. m-cresol at 30° C. The inherent viscosity of the copolyesters ranges from 1.0 to 1.7, preferably 1.4 to 1.6, and more preferably 1.5.

The number-average molecular weight (Mn) of the copolyester of the above viscosities ranges from 10,000 to 50,000, preferably 20,000 to 30,000, and more preferably 25,000.

The acid number of the segmented copolyester is determined by titrating a gram of copolyester with KOH and is the number of milligrams of KOH necessary to neutralize the gram of copolyester. The acid number of the copolyester is less than 3.0, preferably less than 2.0.

Preferred segmented copolyesters are those in which the aromatic dicarboxylic acid is of 8 to 16 carbon atoms, the low molecular weight diol is aliphatic diol of 2 to 8 carbon atoms, the long chain glycol is poly(alkylene ether) glycol in which the alkylene group is of 2 to 9 carbon atoms, the short chain ester units amount to about 30 to 65 percent by weight of the copolyester, the long chain ester units amount to about 35 to 70 percent by weight of the copolyester, and the copolyester has a melt index of less than about 50, a melting point of at least about 140° C., an inherent viscosity of about 1.4 to 1.6 and an acid number of 1 to less than 2.

The copolyesters prepared from terephthalic acid, or a mixture of terephthalic and isophthalic acids, 1,4-butanediol and polytetramethylene ether glycol having a molecular weight of about 600 to 3000 are particularly preferred in the compositions of this invention. The raw materials are readily available, and the adhesive and coating properties of compositions obtained from such polymers are outstanding.

The copolyesters used in the compositions of this invention can be made by conventional condensation polymerization procedures, as for example, in bulk or in a solvent medium which dissolves one or more of the monomers. They are conveniently prepared by a conventional ester interchange reaction. A preferred procedure involves heating, for example, the dimethyl ester of terephthalic acid, or a mixture of terephthalic and isophthalic acid, with a long chain glycol which may be polytetramethylene ether glycol and an excess of a short chain diol which may be butanediol in the presence of a catalyst at 150° to 260° C., followed by distilling off the methanol formed by the interchange. Heating is continued until methanol evolution is complete.

Depending on the temperature, catalyst and diol excess, this polymerization is complete within a few minutes to a few hours. This procedure results in the preparation of a low molecular weight prepolymer which can be converted to the high molecular weight segmented copolyester of this invention.

These prepolymers can also be prepared by a number of alternate esterification or ester interchange processes. For example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate diacids, anhydrides, or acid chlorides, for example, with diols or by other processes such as reaction of the diacids with cyclic ethers or carbonates. Obviously the prepolymer can also be prepared by carrying out these processes in the presence of the long chain glycol.

The resulting prepolymer is then converted to the high molecular weight segmented copolyester by distillation of the excess of low molecular weight diol. Best results are usually obtained if this final distillation is carried out at less than 1 mm. pressure and 240°-260° C. for less than 2 hours in the presence of an antioxidant such as sym-di-beta-naphthyl-p-phenylenediamine or 1,3,5-trimethyl-2,4,6-tris[3,5-ditertiarybutyl-4-hydroxybenzyl] benzene.

Most practical polymerization techniques rely upon ester interchange to complete the polymerization reaction. In order to avoid excess hold times at high temperatures with possible irreversible thermal degradation, it is advantageous to employ a catalyst for the ester interchange reaction. While a wide variety of catalysts can be used, organic titanates such as tetrabutyl titanate, used alone or in combination with magnesium or zinc acetates, are preferred. Complex titanates, such as $Mg[HTi(OR)_6]_2$ (R ranges from 2 to 5 carbon atoms), derived from alkali or alkaline earth metal alkoxides and titanate esters are also very effective. Inorganic titanates such an lanthanum titanate, calcium acetate/antimony trioxide mixtures and lithium and magnesium alkoxides are representative of other catalysts which can be used.

While these condensation polymerizations are generally run in the melt without added solvent, it is sometimes advantageous to run them in the presence of inert solvent in order to facilitate removal of volatile products at lower than usual temperatures. This technique is especially valuable during prepolymer preparation, for example, by direct esterification. However, certain low molecular weight diols, for example, butanediol in terphenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers.

The processes described above can be run both by batch and continuous methods. The preferred method for continuous polymerization, namely, ester interchange with a prepolymer, is a well established commercial process.

In addition to the segmented copolyester, the compositions of this invention contain one or more low molecular weight thermoplastic resins which form compatible mixtures with the segmented copolyester, are thermally stable at about 150° C., and have melt viscosities of less than about 10,000 centipoises at 200° C.

The term "thermoplastic resin", as used throughout the specification and claims, is intended to include heat softenable resins, both natural and synthetic, as well as waxy types of materials.

By the term "compatible" it is meant that there is no separation into distinct layers between the segmented copolyester and the low molecular weight resin or resins at the copolyester melt temperature. In some cases this compatibility is achieved in blends of multicomponent resins even though one of the low molecular weight thermoplastic resin components may not be compatible with the segmented copolyester alone.

By the phrase "thermally stable", it is meant that there is no significant permanent alteration in the properties of the resin after heating at the specified temperature for one hour in the presence of air. The melt viscosities specified herein are measured with a Brookfield viscometer by ASTM test method D 1824-66 at elevated temperatures as indicated.

Suitable low molecular weight thermoplastic resins include hydrocarbon resins, bituminous asphalts, coal tar pitches, rosins, rosin based alkyd resins, phenolic resins, chlorinated aliphatic hydrocarbon waxes, chlorinated polynuclear aromatic hydrocarbons, and mixtures thereof.

The term "hydrocarbon resins" refers to hydrocarbon polymers derived from coke-oven gas, coal-tar fractions, cracked and deeply cracked petroleum stocks, substantially pure hydrocarbon feeds, and turpentines. Typical hydrocarbon resins include coumarone-indene resins, petroleum resins, styrene polymers, cyclopentadiene resins, and terpene resins. These resins are fully described in the Kirk-Othmer "Encyclopedia of Chemical Technology", Second Edition, 1966, Interscience Publishers, New York, Volume 11, Pages 242 to 255.

The term "coumarone-indene resins" refers to hydrocarbon resins obtained by polymerization of the resin formers recovered from coke-oven gas and in the distillation off coal tar and derivatives thereof such as phenolmodified coumarone-indene resins. These resins are fully described in the Kirk-Othmer Encyclopedia, supra, Volume 11, Pages 243 to 247.

The term "petroleum resins" refers to hydrocarbon resins obtained by the catalytic polymerization of deeply cracked petroleum stocks. These petroleum stocks generally contain mixtures of resin formers such as styrene, methyl styrene, vinyl toluene, indene, methyl indene, butadiene, isoprene, piperylene and pentylenes. These resins are fully described in the Kirk-Othmer Encyclopedia, supra, Volume 11, Pages 248 to 250. The so-called "polyalkylaromatic resins" fall into this classification.

The term "styrene polymers" refers to low molecular weight homopolymers of styrene as well as copolymers containing styrene and other comonomers such as alpha-methyl-styrene, vinyl toluene, butadiene, etc.

The term "vinyl aromatic polymers" refers to low molecular weight homopolymers of vinyl aromatic monomers such as styrene, vinyl toluene, and alphamethyl styrene, copolymers of two or more of these monomers with each other, and copolymers containing one or more of these monomers in combination with other monomers such as butadiene, and the like. These polymers are distinguished from petroleum resins in that they are prepared from substantially pure monomer.

The term "cyclopentadiene resins" refers to cyclopentadiene homopolymers and copolymers derived from coal tar fractions or from cracked petroleum streams. These resins are produced by holding a cyclopentadiene-containing stock at elevated temperature for an extended period of time. The temperatures at which it is held determines whether the dimer, trimer, or higher polymer is obtained. These resins are fully described in the Kirk-Othmer Encyclopedia, supra, Volume 11, Pages 250 and 251.

The term "terpene resins" refers to polymers of terpenes which are hydrocarbons of the general formula $C_{10}H_{16}$ occurring in most essential oils and oleoresins of plants, and phenol-modified terpene resins. Suitable terpenes include alpha-pinene, beta-pinene, dipenetene, limonene, myrcene, bornylene, camphene, and the like. These products occur as by-products of coking operations of petroleum refining and of paper manufacture. These resins are fully described in the Kirk-Othmer Encyclopedia, supra, Volume 11, Pages 252 to 254.

The term "bituminous asphalts" is intended to include both native asphalts and asphaltites such as Gilsonite, Glance pitch and Grahanite. A full description of bituminous asphalts can be found in Abraham's "Asphalts and Allied Substances", 6th Edition, Volume 1, Chapter 2, Van Nostrand Co., Inc., particularly Table III on Page 60.

The term "coal tar pitches" refers to the residues obtained by the partial evaporation or distillation of coal tar obtained by removal of gaseous components from bituminous coal. Such pitches include gas-works coal tar pitch, coke-oven coal tar pitch, blast-furnace coal tar pitch, producer-gas coal tar pitch, and the like. These pitches are fully described in Abraham's "Asphalts and Allied Substances", supra, particularly Table III on Page 61.

The term "rosins" refers to the resinous materials that occur naturally in the oleoresin of pine trees, as well as derivatives thereof including rosin esters, modified rosins such as fractionated, hydrogenated, dehydrogenated and polymerized rosins, modified rosin esters and the like. These materials are fully described in the Kirk-Othmer Encyclopedia, supra, Volume 17, Pages 475 to 505.

The term "rosin based alkyd resins" refers to alkyd resins in which all or a portion of the monobasic fatty acid is replaced by rosin (a mixture of diterpene resin acids and non-acidic components). Unmodified alkyd resins are polyester products composed of polyhydric alcohol, polybasic acid and monobasic fatty acid. Rosin based alkyd resins are described in the Kirk-Othmer Encyclopedia, supra, Volume 1, Pages 851, 865 and 866.

The term "phenolic resins" refers to the products resulting from the reaction of phenols with aldehydes. In addition to phenol itself, cresols, xylenols, p-tert.-butylphenol, p-phenylphenol and the like may be used as the phenol component. Formaldehyde is the most common aldehyde, but acetaldehyde, furfuraldehyde and the like may also be used. These resins are fully described in the Kirk-Othmer Encyclopedia, supra, Volume 15, Pages 176 to 207.

The term "chlorinated aliphatic hydrocarbon waxes" refers to those waxes which are commonly called "chlorinated waxes" such as chlorinated paraffin waxes. These waxes typically contain about 30-70 percent by weight of chlorine.

The term "chlorinated polynuclear aromatic hydrocarbons" refers to chlorinated aromatic hydrocarbons containing two or more aromatic rings such as chlorinated biphenyls, terphenyls, and the like, and mixtures thereof. These materials typically contain 30 to 70 percent by weight of chlorine.

The compositions of this invention contain about 1 to 99 percent by weight, preferably 5 to 95 percent by weight, of thermoplastic segmented copolyester elastomer and about 1 to 99 percent by weight, preferably 5 to 95 percent by weight, of low molecular weight thermoplastic resin. More preferably, the composition contains about 20 to 60 percent by weight of elastomer and about 40 to 80 percent by weight of resin.

Typically the compositions of this invention contain more than one low molecular weight thermoplastic resin. For example, low molecular weight vinyl aromatic polymers, e.g., styrene polymers, have been found to lower the melt viscosity of these compositions without substantially lowering the softening point. Since low melt viscosity contributes improved wetting by the composition of the surface of the substrate, which results in better adhesion, many useful compositions will contain some vinyl aromatic polymer. Vinyl aromatic polymers such as styrene are also useful for increasing the compatibility of other resins with the segmented copolyester. Coumarone-indene resins of high softening point have been found to give strength to the compositions. Phenol-modified coumarone-indene resins have been found to have the effect of lowering the softening point of the compositions. In fact, the effect of phenol-modified coumarone-indene resins on the melting point is so great that the desired melting point is generally achieved by the addition of only a small amount of this resin. Any combination of these dried properties can be achieved by mixing two or more low molecular weight thermoplastic resins with the copolyester in a proper proportion. The low molecular weight thermoplastic resins also have the effect of lowering the cost of the composition.

In order to prevent loss in properties, such as viscosity, which affect the adhesion characteristics of the thermoplastic compositions prepared from a segmented copolyester and at least one compatible thermoplastic resin, it is necessary that to the segmented copolyester or to the thermoplastic composition, as the case may be, there is added 0.05 to 3.0 percent by weight, preferably 0.1 to 1.0 percent by weight, of segmented copolyester or 0.1 to 4.0 percent by weight, preferably 0.25 to 2.5 percent by weight, of thermoplastic composition, respectively, of an alkaline earth oxide such as beryllium, magnesium, calcium, strontium, and barium oxides. Calcium oxide is preferred.

It has been found that in many adhesive thermoplastic compositions of thermoplastic segmented copolyester and low molecular weight thermoplastic resin improved stability is achieved by adding, in conjunction with the alkaline earth oxide 0.25 to 2.5 percent by weight of segmented copolyester or 0.1 to 1.0 percent by weight of thermoplastic composition, respectively, of linear polycarbodiimide having an average of at least two carbodiimide groups per molecule.

The linear polycarbodiimide is represented by the formula

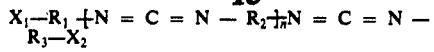

wherein $R_1$, $R_2$, and $R_3$ are $C_1$-$C_{12}$ aliphatic, $C_6$-$C_{15}$ cycloaliphatic, or $C_6$-$C_{15}$ aromatic divalent hydrocarbon radicals, and combinations thereof; $X_1$ and $X_2$ are H,

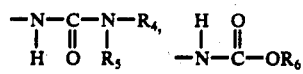

where $R_4$, $R_5$, and $R_6$ are $C_1$-$C_{12}$ aliphatic, $C_5$-$C_{15}$ cycloaliphatic and $C_6$-$C_{15}$ aromatic monovalent hydrocarbon radicals and combinations thereof and additionally $R_4$ or $R_5$ can be hydrogen; and n is a number of at least 1, preferably 1 to 7. The useful polycarbodiimides have an average of at least two carbodiimide groups (i.e., two —N.= C = N— groups) per molecule and an average molecular weight of less than about 500 per carbodiimide group. These polycarbodiimides can be aliphatic, cycloaliphatic, or aromatic polycarbodiimides. The terms aliphatic, cycloaliphatic, and aromatic as used herein indicate that the carbodiimide group is attached directly to an aliphatic group, a cycloaliphatic group, or an aromatic nucleus respectively. For example, these carbodiimides are illustrated by the above formula wherein $R_1$, $R_2$, and $R_3$ are independently aliphatic, cycloaliphatic, or aromatic divalent hydrocarbon radicals and n is at least 1 and preferably 1-7. $X_1$ and $X_2$ and defined as hereinbefore. Polycarbodiimides useful for the compositions of this invention have more than two polycarbodiimide groups and thus more than three divalent hydrocarbon groups (i.e., $R_1$, $R_2$, $R_3$ ... $R_n$) and each of these hydrocarbon groups can be the same or different from the others so that the polycarbodiimides can have aliphatic, cycloaliphatic, and aromatic hydrocarbon groups in one polycarbodiimide molecule.

Polycarbodiimides can be prepared for use in this invention by well-known procedures. Typical procedures are described in U.S. Pat. Nos. 3,450,562 to Hoeschele; 2,941,983 to Smeltz; 3,193,522 to Neumann et al.; and 2,941,966 to Campbell.

Generally, polycarbodiimides are prepared by polymerization of organic diisocyanates. The isocyanate groups on a diisocyanate molecule polymerize with isocyanate groups on other diisocyanate molecules so that the resulting polycarbodiimide molecule is a linear polymer of organic radicals (i.e., aliphatic, cycloaliphatic, aromatic, or combinations thereof) linked together by carbodiimide groups (i.e., —N = C = N—). The degree of polymerization and the specific diisocyanate determine the molecular weight of the polycarbodiimide and the average molecular weight per carbodiimide group.

Many known organic isocyanates can be polymerized to produce polycarbodiimides useful for stabilized compositions of this invention. Isocyanates which can be polymerized to produce preferred aromatic polycarbodiimides include:
tolylene-2,4-diisocyanate,
tolylene-2,6-diisocyanate,
α,4-tolylene diisocyanate,
1,3- and 1,4-phenylene diisocyanates,
4,4'-methylenebis(phenyl isocyanate),
5-chlorotolylene-2,4-diisocyanate,
1,5-naphthylene diisocyanate,
1,6-hexamethylene diisocyanate,
4,4'-methylenebis(cyclohexyl isocyanate), 1,3- and 1,4-cyclohexylene diisocyanates,
1,3-diisopropylphenylene-2,4-diisocyanate,
1-methyl-3,5-diisopropylphenylene-2,4-diisocyanate,
1,3,5-triethylphenylene-2,4-diisocyanate,
triisopropylphenylene-2,4-(2,6-)diisocyanate.

Diisocyanates, such as tolylene-2,4-diisocyanate or mixtures thereof with minor amounts of tolylene-2,6-diisocyanate and 4,4'-methylenebis(phenyl isocyanate), can be used to produce preferred unhindered aromatic polycarbodiimides which have only partial ortho substitution on the aromatic nuclei to which polycarbodiimide groups are attached. Diisocyanates such as triisopropylphenylene-1,3-diisocyanate yield preferred hindered aromatic polycarbodiimides.

Polymerization of diisocyanates to produce polycarbodiimides of a given degree of polymerization can be controlled by introducing agents which will cap the terminal isocyanate groups. These agents include monoisocyanates and active hydrogen compounds such as alcohols or amines. Polyisocyanates and other agents which will produce cross-linking of the polycarbodiimide generally should be avoided as cross-linking can reduce solubility and lead to blending problems with the copolyester. Preferably, isocyanate polymerization should be stopped to produce polycarbodiimides having average molecular weight in the range of about 600-2500 and 2-8 carbodiimide linkages. Polycarbodiimides in this preferred range can be readily mixed with copolyester and are sufficiently nonvolatile to prevent loss by vaporization.

The average number of carbodiimide groups per molecule can be estimated for a given polycarbodiimide from the proportions of the reactants employed in its preparation. As described elsewhere, the degree of polymerization of the polycarbodiimide can be controlled by employing capping agents. Alternatively, the average number of carbodiimide groups per molecule in a given polycarbodiimide can be calculated from its molecular weight (obtained by vapor phase osmometry or ebulliscopic procedures) and its assay for carbodiimide groups [determined by the method of Campbell and Smeltz, J. Org. Chem., 28, 2069-2075 (1963)].

A particularly preferred polycarbodiimide is sold under the tradename Stabaxol® PCD by Mobay Chemical, Pittsburgh, Pennsylvania.

Additional compounds which can be added, singly or in combination, with the alkaline earth oxide with or without the presence of polycarbodiimide, include:

1. 0.25 to 5.0 percent by weight of segmented copolyester or 0.1 to 2.0 percent by weight of thermoplastic composition, respectively, of a compound taken from the group consisting of hindered phenols, nitrogen-containing hindered phenols and hindered secondary amines. Useful hindered phenols include: 2,6-ditertiarybutyl-p-cresol; 4,4'-bis(2,6-ditertiarybutylphenol); 4,4',4''-(2,4,6-trimethyl-5-phenyl) trimethylene) tris 2,6-di-tert.-butyl phenol; 1,3,5-trimethyl-2,4,6-tris[3,5-ditertiarybutyl-4-hydroxybenzyl] benzene; 4,4'-butylidene bis(6-tertiary-butyl-m-cresol); α, α'-oxybis(2,6-di-tert.-butyl-p-cresol; 2,6-di-tert.-butyl-α-methoxy-p-cresol; 2,6 bis(5-tert.-butyl-4-hydroxy-m-tolyl) mesitol; 4,4'-methylene-bis(2,6-di-tert.-butyl-phenol); 2,2'-methylene-bis-(6-tert.-butyl-4-methyl) phenol; 4,4'-(tetramethyl-p-phenylene) dimethylene-bis-2,6-di-tert.-butyl phenol; 2,2',6,6'-tetra-tert.-butyl-p,p' biphenol; 3,5-ditert.-butyl-4-hydroxy benzyl alcohol; 4,4'-isopropylidine-bis-butylated phenol; 2,5-ditert.-butyl hydroquinone, 2,2'- methylenebis(6-tert-butyl-4-methyl phenol); 2,2'-methylenebis(6-tert-butyl-4-ethyl phenol); 2,2'-methylenebis [4-methyl-6-(1,1,3,3-tetramethyl)butyl phenol]; 4,4'bis(2-tert-butyl-5-methyl phenol) sulfide; 4,4'-butylidene-bis(2-tert-butyl-5-methyl phenol); 2,2'-methylenebis(4,6-dimethyl phenol); 2-tert-butyl-4(4-tert-butyl phenyl)phenol; 2-tert-butyl-4-phenyl phenol; 2,6-dibenzyl-4-methyl phenol; 2-benzyl-4-methyl phenol; 2-benzyl-6-tert-butyl-4-methyl phenol; 2-benzyl-6-tert-butyl-4-ethyl phenol; 2,4-dimethyl-6-(1-methyl-1-cyclohexyl) phenol, 2,6-diisopropyl-4-methyl phenol; 2,4-dimethyl-6-isopropyl phenol; 2-tert-butyl-4,6-dimethyl phenol; 2-tert-butyl-4-methyl phenol; 2-(1,1,3,3-tetra-methyl butyl)-4- methyl phenol; 2,4,6;L-trimethyl phenol; 2,6-di-tert-butyl-4-methyl phenol; 2,6-di-tert-butyl-4-ethyl phenol; 4-phenyl phenol; 2,6-diisopropyl phenol; 2,6-di-tert-butyl-4-phenyl phenol; 2,6-di-tert-butyl-4(4-tert-butyl-phenyl)phenol; 2,5-di-tert-butyl-hydroquinone; 2,5-di-tert-amyl hydroquinone, and alpha-conidendrine. Mixtures of the foregoing may be used. The preferred hindered phenol is tetrakis[methylene-3-(3',5'-ditertiary-butyl-4'-hydroxyphenyl)propionate] methane.

Suitable nitrogen-containing hindered phenols include 2,6-di-tert-butyl-α-dimethylamino-p-cresol; 4-hydroxydodecanalide; 4-hydroxy butyranalide; p-butylaminophenol; 2,4-bis[n-octylthio]-6[4'-hydroxy-3,5'ditertiary butyl anilio]-1,3,5-triazine. A preferred compound is CHA 1014 sold by Ciba-Geigy, Ardsley, New York, described in Example 40.

Useful secondary amine compounds are 4,4'-dioctyl diphenylamine; diethyl dinonyl diphenylamine; 4-isopropoxy diphenylamine; N,N'-diphenyl-1,2-propanediamine; octylated diphenylamine; p-isopropoxydiphenylamine; phenyl-α-naphthylamine; phenyl β-naphthylamine; N,N'diphenylethylene diamine; N',N'-di-o-tolyethylene diamine; N',N'-diphenyl-1,2-propylene diamine; N,N'-diphenyl-p-phenylene diamine. A preferred secondary amine is N,N'-di-2-naphthylparaphenylenediamine.

2. 0.25 to 5.0 percent by weight of segmented copolyester or 0.1 to 2.0 percent by weight of thermoplastic composition, respectively, of a dialkylthiodipropionate ester of 12 to 18 carbon atoms. Useful esters of this type include preferably distearylthiodipropionate and dilaurylthiodipropionate.

3. 0.25 to 5.0 percent by weight of segmented copolyester or 0.1 to 2.0 percent by weight of thermoplastic composition, respectively, of a phosphorous acid ester of the formula

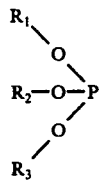

where $R_1$, $R_2$ and $R_3$ are $C_1$ to $C_{18}$ aliphatic, $C_6$ to $C_{15}$ aromatic and combinations thereof. Useful phosphorous acid esters include trioctyl phosphite, pentol triphosphite, trilauryl phosphite, triisodecyl phosphite, diphenyl isooctyl phosphite, (2-ethylhexyl)-octyl-phenyl phosphite, tris(2-ethylhexyl) phosphite, triphenyl phosphite, trimethyl phosphite, triethyl phosphite, diphenyl-p-(α-methylbenzyl) phenyl phosphite, tributyl phosphite, phenyl-di(isodecyl) phosphite, tri-tetrahydrofurfuryl phosphite, di(isodecyl)-2-ethylphenyl phosphite, tri-secondarybutyl phosphite, tri-tertiarybutyl phosphite, trihexyl phosphite, tricyclohexyl phosphite, diphenyl-lauryl phosphite, phenyl-dilauryl phosphite, trinaphthyl phosphite. A preferred compound is trinonylphenyl phosphite sold by Argus Chemical Corp., Brooklyn, New York under the tradename Mark® 1178.

Each of the compounds (1), (2) and (3) are compatible with each other and with calcium oxide and the polycarbodiimide compound. By compatible in this context is meant that the various compounds retain their individual indentity when mixed and do not chemically combine with one another.

The properties of the compositions of this invention can be modified by the incorporation of various conventional inorganic fillers such as wood flour, silicates, silica gel, alumina, clays, chopped fiberglass, titanium dioxide, barium sulfate, carbon black, etc. In general, fillers have the effect of increasing the melt viscosity and the modulus or stiffness of the composition at various elongations.

The properties of the compositions of this invention can be further modified by the incorporation of thermally stable thermoplastic polymers of ethylenically unsaturated monomers including homopolymers of vinyl esters such as vinyl acetate, copolymers of these vinyl esters with other vinyl monomers such as ethylene, vinyl chloride and the like, and polymers of alkyl acrylates and methacrylates, or thermally stable condensation polymers such as polyesters and polyamides, and the like. For example, the addition of a copolymer of ethylene and vinyl acetate often increases the tackiness of pressure sensitive adhesive compositions of this invention. These modifying polymers typically have melt viscosities above about 10,000 centipoises at 200° C. and thus are not low molecular weight thermoplastic resins as defined herein.

The compositions can also be colored by the addition of organic or inorganic pigments or organic dyes where their effect is desired. Suitable inorganic pigments include rutile and anatase titanium dioxides, aluminum powder, cadmium sulfides and sulfo-selenides, lead antimonate, mercury cadmiums, chromates of nickel, tin and lead, ceramic greens such as chromium, cobalt, titanium and nickel oxides, ceramic blacks such as chromium, cobalt and iron oxides, carbon black, ultramarine blue, and the like. Suitable organic pigments include phthalocyanine blues and greens, quinacridones, and the like. Suitable dyes include disperse dyes such as Colour Index Disperse Blues 59, 63 and 64. Optical brightner such as "Uvitex" CF, sold by Ciba Corp., and "Tinopal" AN, sold by Geigy Chemical Corp., may also be incorporated where their effect is desired.

Plasticizers including phthalate esters such as dioctyl phthalate, and aryl phosphates such as tricresyl phosphate, and substituted sulfonamides such as N-cyclohexyl-p-toluene-sulfonamide and the like, may be added for applications where their effect is desired. Flame retardant additives, such as zinc borate, antimony trioxide, tris(2,3-dichloropropyl) phosphate, tris(2,3-dibromopropyl) phosphate, chlorinated waxes, and the like may be added, if desired. Other minor additives such as surfactants or lubricants may also be added.

One of the important advantages of the thermoplastic compositions of this invention is that the copolyesters and the low molecular weight thermoplastic resins are easy to blend together due to the relatively low melt viscosity of these compositions at elevated temperatures as compared to compositions of the prior art having comparable bond strength. The components of the compositions of this invention can be blended by variously well-known procedures such as, for example, blending in molten form, blending in a solvent, or mixing aqueous dispersions of the components. Blending in the melt may be carried out by first melting the stabilized segmented copolyester and then adding low molecular weight thermoplastic resin to the melt, by first melting the low molecular weight thermoplastic resin and then adding stabilized segmented copolyester to the melt, or by first blending the segmented copolyester and the low molecular weight thermoplastic resin together in finely divided form and then melting the blend, for example, on a hot roller mill or by simultaneously feeding the components to an extruder. The alkaline earth oxide stabilizer compound, with or without optional components, can be present prior to blending or can be added with the other components individually or as a mixture.

One method of mixing the alkaline earth oxide stabilizer compound or mixture thereof with the segmented copolyester is to take an amount of the copolyester and mix in the amount of alkaline earth oxide stabilizer and any optional additives described above either individually or as a mixture.

In addition to these blending procedures, it is also possible to take the copolyester while it is still molten, and blend solid, premelted or liquid low molecular weight thermoplastic resin with it. The stabilizer compound or mixture thereof as well as other ingredients such as antioxidants, fillers, plasticizers, and the like can also be added at this time. This blending process can be carried out with an in-line mixer or with a separate mixing vessel, and has the advantage that it does not require isolation of the copolyester.

The thermoplastic compositions of this invention can also be blended by dissolving the segmented copolyester and the low molecular weight thermoplastic resin in a solvent. Suitable solvents for preparing these solutions include chlorinated hydrocarbons such as methylene chloride, chloroform, trichloroethylene, solvent mixtures such as mixtures of trichloroethylene and isopropanol, and the like.

Aqueous dispersions of the thermoplastic compositions of this invention can be prepared by dissolving the segmented copolyester and the low molecular weight thermoplastic resin together in a suitable water-immiscible organic solvent, emulsifying the organic solvent containing the segmented copolyester and the low molecular weight thermoplastic resin in water, and removing the organic solvent as described by Funck and Wolff in U.S. Pat. No. 3,296,172. Dispersions can also be prepared by dissolving the segmented copolyester in a suitable water-immiscible organic solvent, dissolving the low molecular weight thermoplastic resin in a different water-immiscible organic solvent, emulsifying each organic solvent solution in water, removing the organic solvent from each emulsion, thereby forming separate dispersions, and mixing the dispersions together in proper amounts.

Compositions containing about 50 percent by weight or more of segmented copolyester can be used as concentrates for further compounding with the same or other low molecular weight thermoplastic resins and modifiers, as well as being useful as such. Such concentrated compositions have the advantage of being processable with additional components at lower temperatures and shear requirements than the segmented copolyester itself. For example, a mixture containing an equal weight of segmented copolyester and low molecular weight, thermoplastic styrene homopolymer is typically blended at a minimum temperature of about 170° C. However, additional low molecular weight thermoplastic resins can be mixed with this concentrate at a minimum blending temperature of about 140° C. Moreover, additional low molecular weight thermoplastic resins which have limited compatibility with the segmented copolyester alone tend to be more compatible with such concentrates.

The compositions of this invention are useful as adhesives and as coating compositions. These compositions can be applied in the form of a dry blend, a solution, an aqueous dispersion, or in molten form. The softer compositions are useful as pressure sensitive adhesives which can be applied in the form of a solution, an aqueous dispersion, or in molten form. The method of application does not appreciably affect the performance of the composition.

Conventional application equipment can be used for applying the compositions of this invention in the various forms. For application of solutions or dispersions, as in the case of heat sealing and pressure sensitive adhesives, various known application techniques can be used including brushing, dipping, roll coating, wirewound rod application, doctoring, printing, and the like. Spraying or curtain coating techniques are also applicable to these forms of the compositions.

For application of these compositions in the melt form, dipping, roll coating, calendaring, curtain coating, extruding, hot spraying, and other hot melt application techniques can be used. Standard equipment can be used if the adhesive composition in the molten state is within the inherent viscosity range set forth above. Powder coatings of appropriate nontacky compositions can also be applied by known fluidized bed techniques, electrostatic powder spray application, or plasma spraying.

In using the compositions of this invention as hot melt adhesives, the joining step can be accomplished by applying the molten composition to one surface, bringing the other surface into contact with the molten composition, and allowing the bond to cool. Coatings of these compositions can be bonded to other surfaces or themselves by heat or solvent activation of the coating, and contacting the activated coating with the second surface and allowing the bond to cool or the solvent to evaporate. Heat activation of the coating is typically carried out in an oven or using an infrared lamp. Simultaneous application of heat and pressure, or heat sealing, can be used with these compositions to accomplish bonding. High frequency dielectric and ultrasonic waves can also be used to activate these compositions to effect bonding.

The compositions of this invention are characterized by an outstanding combination of properties. These compositions have demonstrated excellent adhesion to many substrates including difficulty adherable substrates such as polypropylene. The compositions containing up to 50 percent by weight of segmented copolyester typically have 180° peel strengths higher than about 0.2 pounds per linear inch with a variety of substrates. They have high temperature bond strengths, for example, as shown by failure temperatures higher than about 70° C. in the adaptation of the WPS-68 test described below. They have good low temperature flexi bility, that is, resistance to breakage on impact, and a minimum elongation of 50 percent at room temperature. They have tensile strengths higher than 200 psi. at room temperature. The softer compositions are characterized by an outstanding combination of pressure sensitive adhesive properties. Performance of a pressure sensitive adhesive is gauged by measurement of both peel and shear adhesion to standard substrates. Tack is also an important property. Compositions described herein display 180° peel values as high as 4–5 lbs./in. and 90° quick stick values as high as 3.5–4.0 lbs./in. They have good shear strength (300+ hrs. at RT) and similarly exhibit good high temperature bond strength (as high as 185 min. at 70° C.). Tack levels are high (1–6 inches) as measured by rolling ball tack or by Polyken® probe tack measurement (as high as 950 g.). A good balance of all the properties mentioned above can be obtained by proper formulation, or any one property can be specifically enhanced by formulation.

Due to the presence of the stabilizing mixture the compositions have good pot life when heated to 170° to 200° C. for extended periods of time within the period of 12 to 24 hours. Generally the viscosity will vary only ± 25 percent in 12 hours at 190° C.

The compositions containing up to 50 percent by weight of segmented copolyester are particularly useful as hot melt adhesives in a wide variety of adhesive use applications such as edge banding and surface lamination, for example, in furniture manufacture, vinyl lamination, sole attachment and box-toe construction in shoe assembly, and as pressure sensitive adhesives for carpet tiles, vinyl tiles, premium labels, tapes, decals, decorative molding of wood or plastic, and the like.

Compositions containing about 50 percent or more by weight of thermoplastic segmented copolyester are particularly useful in the preparation of molded, extruded, and dipped goods, coatings, binders, extruded adhesives, sealants, and the like. Films can be prepared from these compositions by molding, extrusion and calendaring techniques. These compositions typically contain about 50 to 99 percent by weight of segmented copolyester and about 1 to 50 percent by weight of low molecular weight thermoplastic resin. Preferably they contain about 50 to 95 percent by weight of segmented copolyester and about 5 to 50 percent by weight of low molecular weight thermoplastic resin.

Compositions containing these higher concentrations of segmented copolyester can also be used as concentrates for further compounding with the same or other low molecular weight thermoplastic resins and modifiers, as well as being useful as such. Such concentrated compositions have the advantage of being processable with additional components at lower temperatures and shear requirements than the segmented copolyester itself. For example, a mixture containing an equal weight of segmented copolyester and low molecular weight, thermoplastic styrene homopolymer is typically blended at a minimum temperature of about 170° C. However, additional low molecular weight thermoplastic resins can be mixed with this concentrate at a minimum blending temperature of about 140° C. Moreover, additional low molecular weight thermoplastic resins which have limited compatibility with the segmented copolyester alone tend to be more compatible with such concentrates.

EXAMPLES OF THE INVENTION

The following examples wherein the percentages and parts are by weight illustrate the invention.

In the examples, the viscosity values were determined by charging the segmented copolyester or blend into a Brookfield Thermosel System, manufactured by Brookfield Engineering Laboratories, Stoughton, Massachusetts, equipped with a RVT model viscometer, No. 27, 28 or 29 spindle, preheated at 190°–195° C. and a proportional temperature controller, Model 63A. To insure accuracy of temperature the system was calibrated prior to use with high temperature viscosity standard fluid available from Brookfield Engineering Laboratories. Desired temperature is maintained by use of the proportional temperature controller. As soon as the copolyester or blend was molten the spindle was lowered into the melt and the time recorded. The viscometer was run at 0.5 to 2.5 rpm. The rpm in the examples below is 1.0 unless stipulated. Initial viscosity is the value obtained approximately 30 minutes after start of the viscometer which is generally sufficient to obtain equilibrium of viscosity, and at intervals for a maximum of 12 to 24 hours.

Ring and ball softening points of the blends can be determined by ASTM method E 28-67. Tensile properties can be determined with compression molded samples using ASTM test method D 1708-66.

High temperature bond failure temperatures were determined by an adaptation of test method WPS-68 described by W. Schneider and D. Fabricius in the German periodical "Adhaesion", January, 1969, Pages 28–37. This test measures the temperature at which the bond between a particle board and wood veneer or plastic bond fails under a constant shear stress of 125 g./cm.$^2$ when the environmental temperature is raised by a 10° C. increment every hour.

Test methods used in pressure sensitive adhesive evaluations are procedures developed by the Specifications and Technical Committee of the Pressure Sensitive Tape Council (PSTC) as published in their manual entitled "Test Methods for Pressure Sensitive Tapes-Fifth Edition" and the Polyken® Probe Tack Test. The 180° Peel Adhesion Test (PSTC-1); 90° Peel Quick Stick Adhesion Test (PSTC-5); Rolling Ball Tack Test (PSTC-6); and Shear Adhesion Test (PSTC-7) are described in assignee's Hoh and Reardon application U.S. Ser. No. 439,848, filed Feb. 6, 1974.

Polyken® Probe Tack Test

A Polyken® Probe Tack Tester, Model No. TMI 80-2, was used for this test. This tester is a device for measuring the tackiness of pressure sensitive adhesives, by bringing the flat tip of a probe into contact with the test specimen at a conrolled rate, contact pressure, and dwell time, and subsequently breaking the adhesive bond thus formed, also at a controlled rate. The standard probe is a 0.5-cm. diameter, 304 stainless steel rod which is mounted by means of a collet chuck directly on a mechanical force gauge fitted with a dial indicator.

In these tests, the highly polished end of the probe was used. A contact pressure of 100 g./cm.$^2$, and a dwell time of 1 sec. was also used with the probe and sample being brought into contact and separated at the rate of 1 cm./sec. Further details of this test are available from the Kendall Company or Testing Machines Company.

The Shear test is conducted as follows: Thermal testing of the bonded sample is carried out by suspending it in shear configuration in a circulating air oven held at 50° C. (122° F.). A weight of 1.0 lb. is applied to the end of the melamine strip after the sample has been heated for 0.5 hour. The temperature of the oven is programmed to increase linearly from 50° C. (122° F.) at a rate of 10° C. (18° F.) per hour. The failure temperature is recorded when the weight falls.

The cleavage test is conducted as follows: Samples for this test are prepared in a manner identical to that for the Shear Test. Thermal testing of the aged sample is carried out in a circulating air oven, with the adhesive-bonded area in a horizontal configuration and the melamine laminate on the bottom. A 1.0 lb. weight is suspended from the melamine strip 1.0 in. from the edge of the bonded area. The oven temperature is again programmed linearly, but this time from room temperature at a rate of 10° C. (18° F.) per hour, and the failure temperature is taken when the weight falls.

The following procedure is applicable to the Examples. To a 2-liter resin kettle, equipped with an electric heating mantle and an air driven stirrer was added the amount of resin(s), stabilizer and optional components were added (individually or in combination) and the temperature was raised until the resins were molten. The segmented copolyester was added and the temperature was increased to 190°-200° C. with agitation until a uniform adhesive blend composition was obtained, for example, in the range of up to 2 hours. When a uniform adhesive composition was obtained, the mixture was discharged into one-inch deep-Teflon®-lined aluminum trays and was allowed to cool to room temperature. A sample of the cooled adhesive blend was charged to a thermosel and the viscosity determined as set forth above.

EXAMPLES 1 to 11

Adhesive blend: 40 percent of a segmented copolyester derived from 31.6 percent terephthalic acid, 9.2 percent isophthalic acid, 16.6 percent butanediol and 42.6 percent poly(tetramethylene ether) glycol (abbreviated PTMEG hereafter) having a molecular weight of about 1000, containing 52.6 percent short chain ester units and having a melting point of 142°-144° C. measured by differential thermal analysis, a melt index of 5-8 measured at 200° C., an inherent viscosity of about 1.5 and an acid number of 1.67 and containing 13.0 percent Nevillac® Super Hard resin, an alkylated phenolic modified coumarone-indene resin, hydroxyl No. 113, ring and ball softening point 90°-100° C., sold by Neville Chemical Co., Pittsburgh, Pennsylvania; 13.0 percent Nevillac X-66 resin, an alkylated phenolic modified coumarone-indene resin, hydroxyl No. 130, softening point 10° C., sold by Neville Chemical Co., Pittsburgh, Pennsylvania; 7.0 percent Piccoumaron® 410 HL resin, a polyindene type, highly aromatic, thermoplastic petroleum resin having ring and ball softening point of about 110° C. and a melt viscosity of 158 centipoises at 190° C. sold by Hercules Inc.; and 27.0 percent Barium Sulfate, B.A.R. No. 104 Foam Grade, sold by IMCO—Halliburton Co., Houston, Texas.

The adhesive blend and calcium oxide stabilizer compound and other components indicated in Table 1 were added to the resin kettle and tested in the thermosel as described above with the viscosity being determined at 190° C. for the indicated hours.

TABLE 1

| Example | Stabilizer (%)* CaO/Other components | Viscosity (1000 cps.) at 190° C./Hours at 190° C. |
|---|---|---|
| 1 | 0.25 CaO | 215/Initial; 180/4; 150/8; 125/12 |
| 2 | 1.0 CaO | 220/Initial; 185/8; 170/18 |
| 3 | 0.25/0.25 CaO/PCD | 260/Initial; 235/4; 210/8; 180/12 |
| 4 | 0.50/0.25 CaO/PCD | 264/Initial; 260/2.3; 255/5.3; 255/7.7; 255/11; 215/13 |
| 5 | 1.0/0.25 CaO/PCD | 200/Initial; 203/1.5; 211/6.5; 213/11; 205/14.6; 204/17.6 |
| 6 | 1.0/0.25/1.0 CaO/PCD/1010 | 260/Initial; 264/2.3; 270/4.3; 260/10; 235/16 |
| 7 | 1.0/0.25/1.0 CaO/PCD/445 | 235/Initial; 235/4.5; 230/10; 220/16 |
| 8 | 1.0/0.25/0.5 CaO/PCD/DSTDP | 290/Initial; 295/3; 300/6; 305/12; 285/19.5 |
| 9 | 1.0/0.25/1.0 CaO/PCD/AGW | 265/Initial; 273/4; 275/9; 274/12; 265/18 |
| 10 | 1.5/0.25/1.0/0.5 CaO/PCD/1010/DSTDP | 380/Initial; 390/2; 395/23 |
| 11 | 0.25 PCD | 200/Initial; 140/8; 100/16 |
| Control | None | 167/Initial; 149/2; 117.5/4.5; 82.5/8.5; 65/11.5; 45/16 |

*CaO - Calcium Oxide, Reagent Grade sold by Fisher Chemical Co.
PCD - Stabaxol® PCD (polycarbodiimide) sold by Mobay Chem. Co., Pittsburgh, Pa.
1010 - Irganox® 1010, Hindered Phenol Antioxidant sold by Ciba-Geigy Co.
445 - Naugard® 445, Hindered Secondary Amine Antioxidant sold by Uniroyal.
AGW - Agenite® White, Hinderd Secondary Amine Antioxidant sold by Vanderbilt Co.
DSTDP-Naugard® DSTDP, Distearylthiodipropionate sold by Uniroyal.

The cleavage values for Examples 5 and 8 were 95° and 110° C., respectively. The shear value for Example 5 was 146° C.

EXAMPLES 12 to 20

An adhesive blend similar to the blend of Examples 1 to 11 was prepared except that the Piccoumaron® 410 HL resin was replaced by 7.0 percent Atlac® 382E polyestr resin, a propoxylated biphenol A fumarate polyester resin, acid No. 16, softening point 94°-108° C., sold by ICI America, Inc., Wilmington, Delaware.

The adhesive blend and calcium oxide stabilizer compound and other components indicated in Table 2 were added to the resin kettle and tested in the thermosel as described above with the viscosity being determined at 190° C. for the indicated hours.

TABLE 2

| Example | Stabilizer (%)* CaO/Other components | Viscosity (1000 cps.) at 190° C./Hours at 190° C. |
| --- | --- | --- |
| 12 | 0.33 CaO | 267/Initial; 170/7.5; 120/20.5 |
| 13 | 0.60 CaO | 294/Initial; 260/4.5; 240/12; 230/22 |
| 14 | 0.75 CaO | 275/Initial; 260/5.5; 270/12.5 |
| 15 | 0.30/0.25 CaO/PCD | 275/Initial; 275/7.5; 200/16 |
| 16 | 0.45/0.25 CaO/PCD | 290/Initial; 245/7.5; 180/16 |
| 17 | 0.75/0.25 CaO/PCD | 340/Initial; 450/4; 450/11.5; 410/14 |
| 18 | 0.75/0.25/1.0 CaO/PCD/445 | 330/Initial; 375/4; 345/9; 315/14 |
| 19 | 0.75/0.25/1.0/0.5 CaO/PCD/AGW/DSTDP | 370/Initial; 466/2.5; 485/7.5; 440/14; 385/20 |
| 20 | 0.75/0.25/1.0/0.5 CaO/PCD/1010/DSTDP | 306/Initial; 390/2.5; 410/715; 385/14; 385/20 |
| Control | None | 260/Initial; 200/2.5; 165/4.5; 140/7.5; 85/12.5 |

*See list after Table 1.

The cleavage value for Example 18 was 136° C.

TABLE 3

| Example | Stabilizer (%)* CaO/Other components or other oxides | Viscosity (1000 cps.) at 190° C./Hours at 190° C. |
| --- | --- | --- |
| 21 | 1.0 CaO | 29.5 Initial; 30/4; 32/8; 34/12; 36/16 |
| 22 | 1.0/0.25/1.0 CaO/PCD/1178 | 40/Initial; 44/4; 46/8; 50/12; 53/16 |
| 23 | 1.0/0.25/1.0 CaO/PCD/DSTDP | 28/Initial; 31.5/4; 33/8; 32/12; 32/16 |
| 24 | 1.0/0.25/1.0 CaO/PCD/445 | 46/Initial; 48/4; 50/8; 48/12; 46/16 |
| 25 | 1.0/0.25/1.0 CaO/PCD/1010 | 50/Initial; 56/4; 60/8; 60/12; 60/16 |
| 26 | 1.5/0.25/1.0/0.5** CaO/PCD/1010/DSTDP | 81/Initial; 90/6; 98/12 |
| 27 | 0.25 BaO | 36/Initial; 44/4; 58/8; 70/12; 72/16 |
| 28 | 0.40 BaO | 95/Initial; 105/12 |
| 29 | 0.25 MgO | 27.5/Initial; 30.5/2; 35/10; 32/14 |
| 30 | 0.40 MgO | 47/Initial; 42/12 |
| 31 | 0.10 CaO | 47/Initial; 47/7; 45/16 |
| 32 | 1.0/0.1 CaO/DSTDP | 36/Initial; 60/4; 85/8; 85/12 |
| 33 | 1.0/0.1 CaO/1178 | 36/Initial; 60/4; 85/8; 85/12 |
| Control | None | 35/Initial; 28/3; 20.5/7; 17.5/12; 13/19 |

*See list after Table 1.
1178 - Mark® 1178, Trinonylphenyl phosphite sold by Argus Chemical Co., Brooklyn, New York.
BaO - Barium Oxide, Reagent Grade sold by General Chemical Division, Allied Chemical Co., Morristown, New Jersey.
MgO - Magnesium Oxide, Reagent Grade sold by Fisher Chemical Co., Fair Lawn, New Jersey.
**Added in form of 50% stabilizer concentrate in 50% Elvax® 250 resin, an ethylene-vinyl-acetate resin, 28% vinyl acetate, melt index 22, sold by E. I. du Pont de Nemours and Company, Inc., Wilmington, Delaware.

EXAMPLES 21 to 33

An adhesive blend was prepared from the segmented copolyester described in Examples 1 to 11 and containing 20 percent Piccovar® L-30 resin, a polyindene petroleum resin having a softening point of 30° C. sold by Hercules Inc., 20 percent Piccolastic® A-50 resin, a low molecular weight styrene homopolymer having a softening point of 50° C. and a melt viscosity of 29 centipoises at 190° C. sold by Hercules Inc.; and 20 percent Piccoumaron® 410 HL resin described in Examples 1 to 11.

The adhesive blend and calcium oxide or other alkaline earth oxide compound and the other components indicated in Table 3 were added to the resin kettle and tested in the thermosel as described above with the viscosity being determined at 190° C. for the indicated hours.

EXAMPLES 34 to 37

An adhesive blend was prepared from 40 parts of the segmented copolyester described in Examples 1 to 11 and containing 8 parts Piccolastic® A-50 resin and 10 parts Piccovar® L-30 resin described in Examples 21 to 33; 23 parts Piccoumaron® 410 HL resin and 15 parts of barium sulfate described in Examples 1 to 11; and 1 part pyromellitic dianhydride (PMDA) sold by E. I. Du Pont de Nemours and Co., Inc., Wilmington, Delaware.

The adhesive blend, calcium oxide and other components indicated in Table 4 were added to the resin kettle and tested in the thermosel as described above with the viscosity being determined at 190° C. for the indicated hours.

TABLE 4

| Example | Stabilizer* (parts) CaO/Other components | Viscosity (1000 cps.) at 190° C./Hours at 190° C. |
|---|---|---|
| 34 | 2.0 CaO | 121/Initial; 112/4.5; 98/12 |
| 35 | 2.0/0.25 CaO/PCD | 100/Initial; 90/4; 85/8; 79/12; 74/16 |
| 36 | 2.0/1.0 CaO/1010 | 114/Initial; 110/3.3; 105/6.5 |
| 37 | 2.0/0.25/1.0/0.5 CaO/PCD/1010/DSTDP | 102/Initial; 94/4; 86/8; 80/12; 74/16 |
| Control | None | 100/Initial; 46/4; 28.5/8; 21.5/12; 17/16 |

*See list after Table 1.

The cleavage value for Example 35 was 122° C.

EXAMPLES 38 to 40

An adhesive blend was prepared from 40 parts of the segmented copolyester described in Examples 1 to 11 and containing 13 parts Piccovar® L-30 resin described in Examples 21 to 33; 20 parts Piccoumaron® 410 HL resin and 27 parts barium sulfate described in Examples 1 to 11; and 1 part pyromellitic dianhydride (PMDA).

The adhesive blend, calcium oxide and other components indicated in Table 5 were added to the resin kettle and tested in the thermosel as described above with the viscosity being determined at 190° C. for the indicated hours.

TABLE 5

| Example | Stabilizer* (parts) CaO/Other components | Viscosity (1000 cps.) at 190° C./Hours at 190° C. |
|---|---|---|
| 38 | 1.5/0.25/1.0/0.5** CaO/PCD/1010/DSTDP | 260/Initial; 220/6; 205/12 |
| 39 | 2.0/0.25/1.0 CaO/PCD/1010 | 310/Initial; 275/6; 245/12 |
| 40 | 2.0/0.25/1.0 CaO/PCD/CHA 1014 | 175/Initial; 150/4; 136/8; 125/17 |
| Control | None | 145/Initial; 82/4; 55/8; 30/17 |

*See list after Table 1.
CHA 1014 Irganox® CHA 1014, nitrogen containing hindered phenol antioxidant sold by Ciba-Geigy Co.
**Added in form of 50% stabilizer concentrate in 50% Elvax 250 resin.

The cleavage and shear values for Example 39 were 95° C. and 140° C., respectively.

EXAMPLES 41 to 45

An adhesive blend was prepared from 40 parts of the segmented copolyester described in Examples 1 to 11 and containing 20 parts Piccovar® L-30 resin and 20 parts Piccolastic® A-50 resin described in Examples 21 to 33; and 20 parts Piccoumaron® 410 HL resin; and 1 part pyromellitic dianhydride (PMDA).

The adhesive blend, calcium oxide and other components indicated in Table 6 were added to the resin kettle and tested in the thermosel as described above with the viscosity being determined at 190° C. for the indicated hours.

The cleavage values, thermal and thermal-oxidative, for the indicated examples are as follows. The thermal-oxidative determinations were made after six hours of thermal-oxidative exposure on a thermal roll at 190° C. in air.

| | Cleavage Values (° C.) | |
|---|---|---|
| Example | Thermal | Thermal-Oxidative |
| 42 | 113 | 106 |
| 43 | 117 | 112 |
| 44 | 121 | 115 |
| 45 | 128 | 113 |

EXAMPLES 46 to 48

An adhesive blend similar to the blend of Examples 1 to 11 was prepared except that in place of the PTMEG of the copolyester there was present 42.6 percent polyethylene glycol of molecular weight 4000. The short chain ester content was 42.7 percent, the melting point of the copolyester was 161° C. measured by thermal mechanical analysis and the melt index was 4.6 at 190° C.

The adhesive blend, calcium oxide and other components indicated in Table 7 were added to the resin kettle and tested in the thermosel as described above with the viscosity being determined at 190° C. for the indicated hours.

TABLE 6

| Example | Stabilizer* (parts) CaO/Other components | Viscosity (1000 cps.) at 190° C./Hours at 190° C. |
|---|---|---|
| 41 | 1.5/0.25/1.0/0.5** CaO/PCD/1010/DSTDP | 40/Initial; 38/6; 36/12/ 35/16 |
| 42 | 2.0/0.25/1.0/0.25 CaO/PCD/1010/DSTDP | 55/Initial; 52/4; 48/8; 44/12; 42/16 |
| 43 | 2.0/0.25/0.5/0.5 CaO/PCD/1010/DSTDP | 57/Initial; 53/4; 48/8; 41/14 |
| 44 | 2.0/0.25/0.1/0.5 CaO/PCD/1010/DSTDP | 60/Initial; 57/4; 53/10; 50/16 |
| 45 | 2.0/0.25/0.5/0.1 CaO/PCD/1010/DSTDP | 63/Initial; 60/8; 56/16 |
| Control | None | 35/Initial; 20/7; 13/19 |

*See list after Table 1.
**Added in form of 50% stabilizer concentrate in 50% Elvax® 250 resin.

TABLE 7

| Example | Stabilizer* (%) CaO/PCD | Viscosity (1000 cps.) at 190° C./Hours at 190° C. |
| --- | --- | --- |
| 46 | 1.5 CaO | 175/Initial; 180/4; 165/8; 140/12 |
| 47 | 0.25 PCD | 150/Initial; 100/4; 65/8; 47/12 |
| 48 | 1.5/0.25 CaO/PCD | 130/Initial; 130/4; 115/8; 98/12 |
| Control | None | 120/Initial; 80/4; 60/8; 45/12 |

*See list after Table 1.

EXAMPLES 49 to 52

An adhesive blend similar to the blend of Examples 38 to 40 was prepared except that the copolyester described in Examples 46 to 48 was utilized.

The adhesive blend, calcium oxide and other components indicated in Table 8 were added to the resin kettle and tested in the thermosel as described above with the viscosity being determined at 190° C. for the indicated hours.

TABLE 8

| Example | Stabilizer* (%) CaO/Other components | Viscosity (1000 cps.) at 190° C./Hours at 190° C. |
| --- | --- | --- |
| 49 | 2.0 CaO | 175/Initial; 210/4; 210/8; 205/12 |
| 50 | 0.25 PCD | 70/Initial; 20/4; 9.5/8; 6/12 |
| 51 | 2.0/0.25 CaO/PCD | 185/Initial; 200/4; 220/8; 225/12 |
| 52 | 2.0/0.25/1.0 CaO/PCD/1010 | 140/Initial; 145/4; 148/8; 148/12 |
| Control | None | 43/Initial; 15/4; 6.4/8; 3.9/12 |

*See list after Table 1.

EXAMPLE 53

An adhesive blend similar to the blend of Examples 41 to 45 was prepared except that the segmented copolyester was derived from about 31.3 percent terephthalic acid; 17.4 percent 1,4-cyclohexanedicarboxylic acid, 30.5 percent butanediol and 20.8 percent PTMEG having a molecular weight of about 1000 containing about 76.8 percent short chain ester units and having a melting point of 139° C. measured by differential thermal analysis, a melt index of about 7 measured at 190° C., an inherent viscosity of about 1.1 and an acid number of 1.2.

The adhesive blend, calcium oxide and polycarbodiimide indicated in Table 9 were added to the resin kettle and tested in the thermosel as described above with the viscosity being determined at 190° C. for the indicated hours.

Table 9

| Example | Stabilizer* (%) CaO/PCD | Viscosity (1000 cps.) at 190° C./Hours at 190° C. |
| --- | --- | --- |
| 53 | 2.0/0.25 CaO/PCD | 30/Initial; 25.5/4; 23/8; 21/12; 19.5/16 |
| Control | None | 32/Initial; 28/4; 16/8; 11.5/12; 8.4/16 |

*See list after Table 1.

EXAMPLE 54

An adhesive blend was prepared similar to the blend of Examples 21 to 33 except that the segmented copolyester used is described in Example 53.

The adhesive blend, calcium oxide and polycarbodiimide indicated in Table 10 were added to the resin kettle and tested in the thermosel as described above with the viscosity being determined at 190° C. for the indicated hours.

Table 10

| Example | Stabilizer* (%) CaO/PCD | Viscosity (1000 cps.) at 190° C./Hours at 190° C. |
| --- | --- | --- |
| 54 | 1.5/0.25 CaO/PCD | 38/Initial; 37/4; 36/8; 33.5/12, 31.5/16 |
| Control | None | 20/Initial; 17/4; 14.5/8; 13/12; 11.5/16 |

*See list after Table 1.

EXAMPLE 55

An adhesive blend was prepared similar to Examples 38 to 40 except that the segmented copolyester used is described in Example 53.

The adhesive blend, calcium oxide and other components indicated in Table 11 were added to the resin kettle and tested in the thermosel as described above with the viscosity being determined at 190° C. for the indicated hours.

TABLE 11

| Example | Stabilizer* (%) CaO/Other components | Viscosity (1000 cps.) at 190° C./Hours at 190° C. |
| --- | --- | --- |
| 55 | 1.5/0.25/1.0/0.5** CaO/PCD/1010/DSTDP | 310/Initial; 280/4; 255/8; 235/12; 220/16 |

*See list after Table 1.
**Added in form of 50% stabilizer concentrate at 50% Elvax 250 resin.

EXAMPLE 56

An adhesive blend was prepared from 25 percent of a segmented copolyester derived from 14.3 percent terephthalic acid, and 6.1 percent isophthalic acid, 10.7 percent butanediol and 68.0 percent PTMEG having a molecular weight of about 2100, containing 0.5 percent Ethyl 330, hindered phenol made by Ethyl Corp., Baton Rouge, La. and 27 percent short chain ester units and having a melting point of 97° C. measured by differential thermal analysis, a melt index of 5-7 measured at 190° C., an inherent viscosity of 1.17, and an acid number of less than 2 and containing 24 percent Piccolastic® A-25, 16.5 percent Piccolastic® A-75, 20 percent Picotex® LC, 4.5 percent Elvax® 40 and 10 percent Paraflex® G-62, 2.0 percent calcium oxide, 0.25 percent Stabaxol® PCD and 0.50 percent Irganox® 1010. Piccolastic® A-25 and A-75 are similar to Piccolastic A-50 described in Examples 1 to 11 except that the softening points of the styrene polymer are 25 and 75, respectively. Piccotex® LC is a liquid α-methyl styrene vinyl toluene copolymer manufactured by Hercules, Inc. Elvax® 40 is an ethylene vinyl acetate resin, 40% vinyl acetate, melt index 57, sold by E. I. Du Pont de Nemours and Company, Inc.; Paraflex® G-62 is an expoxidized soybean oil plasticizer sold by Rohm and Haas Co. Stabaxol® PCD and Irganox® 1010 are described in Examples 1 to 11. The blend was tested in the thermosel as described above with the viscosity being determined at 190° C. for the indicated hours:

18/Initial; 13/12 hours.

EXAMPLE 57

An adhesive blend was prepared using 30 percent of the segmented copolyester described in Example 56 and containing 33 percent Piccovar® L-30, 33 percent Piccotex® 75, 4.0 percent XPS-250-40, 2.0 percent calcium oxide, 0.25 percent Stabaxol® PCD and 0.5 percent Irganox® 1010. Piccovar® L-30 is described in Examples 1 to 11, Piccotex® 75 and XPS-250-40 are similar to Piccotex® LC except that the melting points are 75° and 40° C., respectively. Stabaxol® PCD and Irganox® 1010 are described in Examples 1 to 11. The blend was tested in the thermosel as described above with the viscosity being determined at 190° C. for the indicated hours:

19/Initial; 23/13 hours.

EXAMPLE 58

The following adhesive blend formulations were prepared and tested as described above with the viscosity being determined at 190° C. for the indicated hours. The results of aging are set forth in Table 12. The controls contain no stabilizer.

TABLE 12

| Formulation (g.) | (1) | (2) | (3) | (4) | (5) | (6) | (7) | (8) | (9) | (10) | Control |
|---|---|---|---|---|---|---|---|---|---|---|---|
| Copolyester Examples 1 to 11-CaO 1.0 g./PCD 0.25 g. | 41.25 | 41.25 | 41.25 | 41.25 | 41.25 | 100 | (a) | (b) | (c) | (d) | 100 (e) |
| Piccovar® L-30 Resin | 20 | — | — | 10 | 20 | — | — | — | — | — | — |
| Piccolastic® A-50 Resin | 20 | — | — | 8 | 20 | — | — | — | — | — | — |
| Piccoumaron® 410 HL Resin | 20 | 7 | — | 23.5 | 20 | — | — | — | — | — | — |
| Nevillac® X-66 Resin | — | 13 | 13 | — | — | — | — | — | — | — | — |
| Nevillac® Super Hard Resin | — | 13 | 13 | — | — | — | — | — | — | — | — |
| Atlac® 382E | — | — | 7 | — | — | — | — | — | — | — | — |
| Barium Sulfate | — | 27 | 27 | 15 | — | — | — | — | — | — | — |
| Pyromellitic Dianhydride (PMDA) | — | — | — | 1 | 1 | — | — | — | — | — | — |

(a) 0.25% PCD in copolyester.
(b) 1.0% CaO in copolyester.
(c) 1.0/0.25 in Copolyester CaO/PCD
(d) 0.5/0.25 in copolyester CaO/PCD
(e) unstabilized copolyester

| Formulation No. | Thermosel Viscosity (1000 cps.) at 190° C./Hours at 190° C. | | | | |
|---|---|---|---|---|---|
| | Initial | 4 | 8 | 12 | 16 |
| 1 | 58 | 58 | 58 | 56 | 54 |
| Control | 35 | 27 | 21.5 | 17.5 | 14.5 |
| 2 | 225 | 230 | 225 | 210 | 200 |
| Control | 167 | 120 | 85 | 62 | 47 |
| 3 | 410 | 460 | 420 | 410 | 410 |
| Control | 260 | 175 | 120 | 85 | — |
| 4 | 190 | 170 | 150 | 140 | — |
| Control | 100 | 46 | 29 | 21.5 | — |
| 5 | 50 | 44 | 40 | 37.5 | 35 |
| Control | 35 | 8.5 | — | — | — |
| 6 * | 215 | 182 | 150 | 130 | — |
| Control * | 142 | 73 | 46 | 33 | — |
| 7 (a) | 1,950 | 1,850 | 1,700 | 1,550 | 1,420 |
| 8 (b) | 1,950 | 1,830 | 1,800 | 1,750 | 1,700 |
| 9 (c) | 2,000 | 2,000 | 2,000 | 2,000 | 2,000 |
| 10 (d) | 2,000 | 2,000 | 1,980 | 1,880 | 1,800 |
| Control | 1,400 | 880 | 640 | 500 | — |

* 200° C.
All controls contain no added stabilizer

I claim:

1. A thermally stabilized thermoplastic segmented copolyester consisting essentially of a multiplicity of recurring short chain ester units and long chain ester units joined through ester linkages, said short chain ester units amounting to 15 to 75 percent by weight of said copolyester and being of the formula

and said long chain ester units amounting to 25 to 85 percent by weight of said copolyester and being of the formula

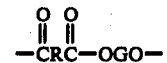

wherein R is the divalent radical remaining after removal of the carboxyl groups from a dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000, said copolyester having a melt index of less than 150, a melting point of at least 90° C., an inherent viscosity in the range of 1.0 to 1.7 and an acid number not greater than 3, stabilized with 0.05 to 3.0 percent by weight, based on the weight of copolyester, of an alkaline earth oxide stabilizer.

2. The copolyester of claim 1 in which the alkaline earth oxide is calcium oxide.

3. The copolyester of claim 1 in which R is a divalent saturated cyclic, aromatic or saturated aliphatic, radical remaining after removal of the carboxyl groups from a saturated cyclic, aromatic or saturated aliphatic, dicarboxylic acid.

4. The copolyester of claim 3 in which R is a divalent aromatic radical remaining after removal of the carboxyl groups from an aromatic dicarboxylic acid.

5. The copolyester of claim 1 in which there is present in combination with the alkaline earth oxide 0.25 to 2.5 percent by weight, based on the weight of copolyester, of a substantially linear polycarbodiimide having an average of at least two carbodiimide groups per molecule.

6. The copolyester of claim 1 in which there is present in combination with the alkaline earth oxide 0.25 to 5.0 percent by weight, based on the weight of copolyester, of at least one compound taken from the group consisting of hindered phenols, nitrogen-containing hindered phenols and hindered secondary amines.

7. The copolyester of claim 5 in which there is present in combination with the alkaline earth oxide and polycarbodiimide 0.25 to 5.0 percent by weight, based on the weight of copolyester, of at least one compound taken from the group consisting of hindered phenols, nitrogen-containing hindered phenols and hindered secondary amines.

8. The copolyester of claim 1 in which there is present 0.25 to 5.0 percent by weight, based on the weight of copolyester, of a dialkylthiodipropionate ester wherein alkyl is of 12 to 18 carbon atoms.

9. The copolyester of claim 1 in which there is present 0.25 to 5.0 percent by weight, based on the weight of copolyester, of a phosphorous acid ester of the formula

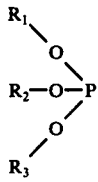

where $R_1$, $R_2$ and $R_3$ are $C_1$ to $C_{18}$ aliphatic, $C_6$ to $C_{15}$ aromatic and combinations thereof.

10. The copolyester of claim 1 in which the short chain ester units amount to 15 to 65 percent by weight of the copolyester, the long chain ester units amount to 35 to 85 percent by weight of the copolyester, and the long chain glycol has a melting point of less than 75° C.

11. The copolymer of claim 1 in which the short chain ester units amount to 15 to 50 percent by weight of copolyester, the long chain ester units amount to 50 to 85 percent by weight of copolyester, the dicarboxylic acid being 55 to 95 percent by weight terephthalic acid, D is the divalent radical remaining after removal of the hydroxyl groups from butanediol, and G is the divalent radical remaining after removal of the terminal groups from polytetramethylene ether glycol having an average molecular weight of 600 to 3500, the copolyester having a melt index of less than 30, a melting point of 90° to 130° C., an inherent viscosity in the range of 1.4 to 1.6, and an acid number less than 2.

12. The copolyester of claim 11 in which the dicarboxylic acid is a mixture of terephthalic acid and isophthalic acid.

13. The copolyester of claim 12 in which the polytetramethylene ether glycol has a molecular weight of 600 to 2100.

14. The copolyester of claim 13 in which the short chain ester units amount to 15 to less than 30 percent by weight of the copolyester and the long chain ester units amount to more than 70 to 85 percent by weight of the copolyester.

15. The copolyester of claim 14 in which the mixture of terephthalic acid and isophthalic acid contains 70 to 95 percent by weight of terephthalic acid.

16. The copolyester of claim 5 in which the polycarbodiimide is represented by the formula:

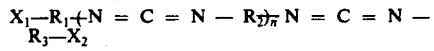

where $R_1$, $R_2$ and $R_3$ are $C_1$—$C_{12}$ aliphatic, $C_5$—$C_{15}$ cycloaliphatic, or $C_6$—$C_{15}$ aromatic divalent hydrocarbon radicals, and combinations thereof; $X_1$ and $X_2$ are hydrogen,

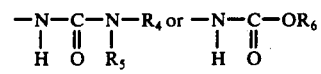

where $R_4$, $R_5$ and $R_6$ are $C_1$—$C_{12}$ aliphatic, $C_5$—$C_{15}$ cycloaliphatic, and $C_6$—$C_{15}$ aromatic monovalent hydrocarbon radicals and combinations thereof, and additionally $R_4$ or $R_5$ can be hydrogen; and $n$ is a number of at least one.

17. The copolyester of claim 6 in which the compound is a hindered phenol.

18. The copolyester of claim 17 in which the hindered phenol is tetrakis[methylene-3-(3',5'-ditertiarybutyl-4'-hydroxyphenol) propionate] methane.

19. The copolyester of claim 6 in which the compound is a nitrogen-containing hindered phenol.

20. The copolyester of claim 6 in which the compound is a secondary aromatic amine.

21. The copolyester of claim 9 in which the phosphorous acid ester is trinonylphenylphosphite.

22. A thermally stabilized thermoplastic hot melt adhesive composition in the molten state which comprises, based on the total thermoplastic components, (A) 1 to 99 percent by weight of thermoplastic segmented copolyester consisting essentially of a multiplicity of recurring short chain ester units and long chain ester units joined through ester linkages, said short chain ester units amounting to 15 to 75 percent by weight of said copolyester and being of the formula

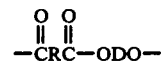

and said long chain ester units amounting to 25 to 85 percent by weight of said copolyester and being of the formula

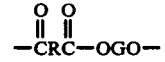

wherein R is the divalent radical remaining after removal of the carboxyl groups from a dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000, said copolyester having a melt index of less than 150, a melting point of at least 90° C., an inherent viscosity in the range of 1.0 to 1.7, and an acid number of less than 3; (B) 1 to 99 percent by weight of low molecular weight thermoplastic resin which forms compatible mixtures with the segmented copolyester, is thermally stable at 150° C., and has a melt viscosity of less than 10,000 centipoises at 200° C.;

stabilized against substantial loss in viscosity in said molten state with (C) 0.1 to 4.0 percent by weight, based on the weight of copolyester and resin, of an alkaline earth oxide.

23. The composition of claim 22 in which the alkaline earth oxide is calcium oxide.

24. The composition of claim 22 in which R is a divalent saturated cyclic, aromatic or saturated aliphatic, radical remaining after removal of the carboxyl groups from a saturated cyclic, aromatic or saturated aliphatic, dicarboxylic acid.

25. The composition of claim 24 in which R is a divalent aromatic radical remaining after removal of the carboxyl groups from an aromatic dicarboxylic acid.

26. The composition of claim 22 in which there is present in combination with the alkaline earth oxide 0.1 to 1.0 percent by weight, based on the weight of copolyester and resin, of a substantially linear polycarbodiimide having an average of at least two carbodiimide groups per molecule represented by the formula:

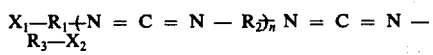

where $R_1$, $R_2$ and $R_3$ are $C_1$—$C_{12}$ aliphatic, $C_5$—$C_{15}$ cycloaliphatic, or $C_6$—$C_{15}$ aromatic divalent hydrocarbon radicals, and combinations thereof; $X_1$ and $X_2$ are hydrogen,

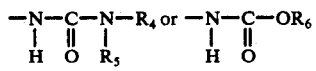

where $R_4$, $R_5$ and $R_6$ are $C_1$—$C_{12}$ aliphatic, $c_5$—$C_{15}$ cycloaliphatic, and $C_6$—$C_{15}$ aromatic monovalent hydrocarbon radicals and combinations thereof, and additionally $R_4$ or $R_5$ can be hydrogen; and $n$ is number of at least one.

27. The compositin of claim 22 in which there is present in combination with the alkaline earth oxide 0.1 to 2.0 percent by weight, based on the weight of copolyester and resin, of at least one compound taken from the group consisting of hindered phenols, nitrogen-containing hindered phenols and hindered secondary amines.

28. The composition of claim 26 in which there is present in combination with the alkaline earth oxide and polycarbodiimide 0.1 to 2.0 percent by weight, based on the weight of copolyester and resin, of at least one compound taken from the group consisting of hindered phenols, nitrogen-containing hindered phenols and hindered secondary amines.

29. The composition of claim 22 in which there is present 0.1 to 2.0 percent by weight, based on the weight of copolyester and resin, of a dialkylthiodipropionate ester wherein alkyl is of 12 to 18 carbon atoms.

30. The composition of claim 22 in which there is present 0.1 to 2.0 percent by weight, based on the weight of copolyester and resin, of a phosphorous acid ester of the formula

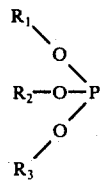

where $R_1$, $R_2$ and $R_3$ are $C_1$ to $C_{18}$ aliphatic, $C_6$ to $C_{15}$ aromatic, and combinations thereof.

31. The composition of claim 22 in which the low molecular weight thermoplastic resin is selected from the group consisting of hydrocarbon resins, bituminous asphalts, coal tar pitches, rosins, rosin based alkyd resins, phenolic resins, chorinated aliphatic hydrocarbon waxes, chlorinated polynuclear aromatic hydrocarbons, and mixtures thereof.

32. The composition of claim 31 in which the thermoplastic composition comprises 5 to 95 percent by weight of segmented copolyester and 5 to 95 percent by weight of low molecular weight thermoplastic resin.

33. The composition of claim 31 which comprises 20 to 60 percent by weight of segmented copolyester and 40 to 80 percent by weight of low molecular weight thermoplastic resin.

34. The composition of claim 31 in which the dicarboxylic acid is an aromatic dicarboxylic acid of 8 to 16 carbon atoms, the low molecular weight diol is aliphatic diol of 2 to 8 carbon atoms, and the long chain glycol is poly(alkylene ether) glycol in which the alkylene group is of 2 to 9 carbon atoms.

35. the composition of claim 34 in which the short chain ester units amount to about 30 to 65 percent by weight of the copolyester, the long chain ester units amount to about 35 to 70 percent by weight of the copolyester, and the copolyester has a melt index of less than 50, a melting point of at least 140° C., an inherent viscosity of about 1.4 to 1.6 and an acid number of 1 to less than 2.

36. The composition of claim 35 in which the dicarboxylic acid is an aromatic dicarboxylic acid selected from the group consisting of terephthalic acid, and mixtures of terephthalic and isophthalic acids, the low molecular weight diol is butanediol, and the long chain glycol is polytetramethylene ether glycol having a molecular weight of 600 to 3000.

37. The composition of claim 36 which comprises 15 to 45 percent by weight of segmented copolyester and 55 to 85 percent by weight of low molecular weight thermoplastic resin.

38. The composition of claim 37 in which the low molecular weight thermoplastic resin is a mixture of at least two low molecular weight thermoplastic resins.

39. The composition of claim 38 in which one of the low molecular weight thermoplastic resins is a styrene polymer.

40. The composition of claim 38 in which one of the low molecular weight thermoplastic resins is a coumarone-indene resin.

41. The composition of claim 38 in which one of the low molecular weight thermoplastic resins is a bituminous asphalt.

42. The composition of claim 38 in which one of the low molecular weight thermoplastic resins is a rosin.

43. The composition of claim 38 in which one of the low molecular weight thermoplastic resins is a terpene resin.

44. The composition of claim 31 in which the dicarboxylic acid is a mixture of terephthalic acid and isophthalic acid.

45. The composition of claim 44 in which the polytetramethylene ether glycol has a molecular weight of 600 to 2100.

46. The composition of claim 45 in which the short chain ester units amount to 15 to less than 30 percent by weight of the copolyester and the long chain ester units amount to more than 70 to 85 percent of the copolyester.

47. The composition of claim 46 in which the mixture of terephthalic acid and isophthalic acid contains 60 to 95 percent by weight of terephthalic acid.

48. Method of preparing a thermoplastic composition which comprises blending in molten form, based on the total thermoplastic components, A. 1 to 99 percent by weight of thermoplastic segmented copolyester consisting essentially of a multiplicity of recurring short chain ester units and long chain ester units joined through ester linkages, said short chain ester units amounting to 15 to 75 percent by weight of said copolyester and being of the formula:

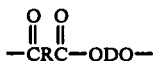

and said long chain ester units amounting to 25 to 85 percent by weight of said copolyester and being of the formula:

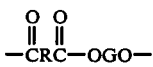

wherein R is the divalent radical remaining after removal of the carboxyl groups from dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000, said copolyester having a melt index of less than 150, a melting point of at least 90° C., an inherent viscosity in the range of 1.0 to 1.7, and an acid number not greater than 3.0;

B. 1 to 99 percent by weight of low molecular weight thermoplastic resin which forms compatible mixtures with the segmented copolyester, is thermally stable at 150° C., and has a melt viscosity of less than 10,000 centipoises at 200° C.; stabilized against substantial loss of viscosity in said molten form with C. 0.1 to 4.0 percent by weight, based on the weight of copolyester and resin, of an alkaline earth oxide.

49. The method of claim 48 in which the alkaline earth oxide is calcium oxide.

50. The method of claim 48 in which R is a divalent saturated cyclic, aromatic or saturated aliphatic radical remaining after removal of the carboxyl groups from a saturated cyclic, aromatic or saturated aliphatic, dicarboxylic acid.

51. The method of claim 50 in which R is a divalent aromatic radical remaining after removal of the carboxyl groups from an aromatic dicarboxylic acid.

52. The method of claim 48 in which there is present in combination with the alkaline earth oxide 0.1 to 1.0 percent by weight, based on the weight of copolyester and resin, of a substantially linear polycarbodiimide having an average of at least two carbodiimide groups per molecule represented by the formula:

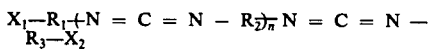

where $R_1$, $R_2$ and $R_3$ are $C_1$-$C_{12}$ aliphatic, $C_5$-$C_{15}$ cycloaliphatic, or $C_6$-$C_{15}$ aromatic divalent hydrocarbon radicals, and combinations thereof; $X_1$ and $X_2$ are hydrogen,

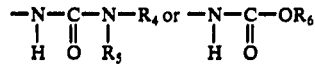

where $R_4$, $R_5$ and $R_6$ are $C_1$-$C_{12}$ aliphatic, $C_5$-$C_{15}$ cycloaliphatic, and $C_6$-$C_{15}$ aromatic monovalent hydrocarbon radicals and combinations thereof, and additionally $R_4$ or $R_5$ can be hydrogen; and $n$ is a number of at least one.

53. The method of claim 48 in which there is present with the alkaline earth oxide 0.1 to 2.0 percent by weight, based on the weight of copolyester and resin, of at least one compound taken from the group consisting of hindered phenols, nitrogen-containing hindered phenols and hindered secondary amines.

54. The method of claim 52 in which there is present in combination with the alkaline earth oxide and polycarbodiimide 0.1 to 2.0 percent by weight, based on the weight of copolyester and resin, of at least one compound taken from the group consisting of hindered phenols, nitrogen-containing phenols and hindered secondary amines.

55. The method of claim 48 in which there is present 0.1 to 2.0 percent by weight, based on the weight of copolyester and resin, of a dialkylthiodipropionate ester wherein alkyl is of 12 to 18 carbon atoms.

56. The method of claim 48 in which there is present 0.1 to 2.0 percent by weight, based on the weight of copolyester and resin, of a phosphorous acid ester of the formula

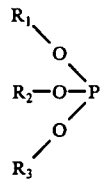

where $R_1$, $R_2$ and $R_3$ are $C_1$ to $C_{18}$ aliphatic $C_6$ to $C_{15}$ aromatic, and combinations thereof.

57. The method of claim 48 in which the short chain ester units amount to 15 to 65 percent by weight of the copolyester, the long chain ester units amount to 35 to 85 percent by weight of the copolyester, and the long chain glycol has a melting point of less than 75° C.

58. The method of claim 57 in which the low molecular weight thermoplastic resin is selected from the group consisting of hydrocarbon resin, bituminous asphalts, coal tar pitches, rosins, phenolic resins, chlorinated aliphatic hydrocarbon waxes, chlorinated polynuclear aromatic hydrocarbons and mixtures thereof.

59. The method of claim 58 in which the stabilized segmented copolyester is first melted and the low molecular weight thermoplastic resin is added to the melt.

60. The method of claim 58 in which the low molecular weight thermoplastic resin is first melted and the stabilized segmented copolyester is added to the melt.

61. The method of claim 58 in which the segmented copolyester and the low molecular weight thermoplastic resin are blended together in finely divided form and melted together and the stabilizer is present prior to blending.

62. The method of claim 58 in which the segmented copolyester and the low molecular weight thermoplastic resin are blended together in finely divided form and melted together, the alkaline earth oxide being added with the other components.

63. The method of claim 62 in which there is added with the alkaline earth oxide a substantially linear polycarbodiimide having an average of at least two carbodiimide groups per molecule represented by the formula:

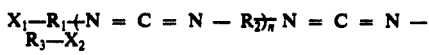

where $R_1$, $R_2$ and $R_3$ are $C_1$-$C_{12}$ aliphatic, $C_5$-$C_{15}$ cycloaliphatic, or $C_6$-$C_{15}$ aromatic divalent hydrocarbon radicals, and combinations thereof; $X_1$ and $X_2$ are hydrogen,

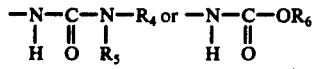

where $R_4$, $R_5$ and $R_6$ are $C_1$-$C_{12}$ aliphatic, $C_5$-$C_{15}$ cycloaliphatic, and $C_6$-$C_{15}$ aromatic monovalent hydrocarbon radicals and combinations thereof, and additionally $R_4$ or $R_5$ can be hydrogen; and $n$ is a number of at least one.

64. The method of claim 63 in which there is present with the alkaline earth oxide and substantially linear polycarbodiimide at least one compound taken from the group consisting of hindered phenols, nitrogen-containing hindered phenols and hindered secondary amines.

65. The method of claim 64 in which there is also present a dialkylthiodipropionate ester wherein alkyl is of 12 to 18 carbon atoms.

66. The method of claim 65 in which there is also present phosphorous acid esters of the formula

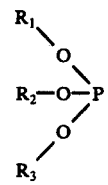

where $R_1$, $R_2$ and $R_3$ are $C_1$ to $C_{18}$ aliphatic, $C_6$ to $C_{15}$ aromatic, and combinations thereof.

* * * * *